United States Patent
Yoshida et al.

(10) Patent No.: US 7,787,147 B2
(45) Date of Patent: *Aug. 31, 2010

(54) PRINTING METHOD AND APPARATUS CORRECTING INK EJECTION IN EACH ROW REGION USING A COMBINED CORRECTION VALUE FOR CERTAIN COEXISTENT ROW REGIONS

(75) Inventors: Masahiko Yoshida, Shiojiri (JP);
Tatsuya Nakano, Hata-machi (JP);
Bunji Ishimoto, Matsumoto (JP); Toru Miyamoto, Shiojiri (JP); Hirokazu Nunokawa, Matsumoto (JP); Yoichi Kakehashi, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 497 days.

This patent is subject to a terminal disclaimer.

(21) Appl. No.: 11/846,820

(22) Filed: Aug. 29, 2007

(65) Prior Publication Data

US 2008/0100855 A1    May 1, 2008

(30) Foreign Application Priority Data

Aug. 29, 2006    (JP)    ............................. 2006-232803

(51) Int. Cl.
H04N 1/034    (2006.01)
H04N 1/401    (2006.01)
H04N 1/409    (2006.01)
B41J 2/01    (2006.01)
B41J 29/393    (2006.01)

(52) U.S. Cl. ...................... 358/1.8; 358/3.24; 358/3.26; 358/502; 347/12; 347/14; 347/19

(58) Field of Classification Search .................. 358/1.8, 358/1.9, 3.24, 3.26, 502, 504, 406, 296; 347/9, 347/12, 14, 15, 19, 40, 43

See application file for complete search history.

(56) References Cited

U.S. PATENT DOCUMENTS 6,908,173 B2 *    6/2005    Otsuki et al. .................. 347/19

(Continued)

FOREIGN PATENT DOCUMENTS

JP    2-54676 A    2/1990

(Continued)

*Primary Examiner*—Scott A Rogers
(74) *Attorney, Agent, or Firm*—Sughrue Mion, PLLC

(57) ABSTRACT

A printing method includes determining a first correction value corresponding to a first print mode, determining a second correction value corresponding to a second print mode, and correcting an ink ejection amount of each row region individually, using a combined correction value obtained by combining the first correction value and the second correction value. The first print mode is a print mode that is applied to a front end area, with respect to a transport direction, of a medium. Dot rows are formed extending in a nozzle movement direction that is perpendicular to the transport direction, on a plurality of row regions lined up in the transport direction. The dot rows are formed by repeating a movement ejection operation of ejecting ink onto the medium while moving nozzles in the movement direction, and a transport operation of transporting the medium in the transport direction. The first correction value is for correcting an ejection amount of the ink in each row region individually. The second print mode is a print mode that is applied to a middle area, with respect to the transport direction, of the medium. The second correction value is for correcting an ejection amount of the ink in each row region individually. The correction of the ejection amount using the combined correction value is carried out in a coexistent segment in which certain row regions and another row regions are coexistent. The certain row regions are row regions in which the dot rows are formed by the first print mode. The other row regions are row regions in which the dot rows are formed by the second print mode.

12 Claims, 21 Drawing Sheets

U.S. PATENT DOCUMENTS

| | | |
|---|---|---|
| 6,938,977 B2 * | 9/2005 | Corbin et al. .................. 347/19 |
| 7,556,335 B2 * | 7/2009 | Yamasaki et al. ............. 347/19 |
| 7,568,781 B2 * | 8/2009 | Yoshida et al. ................ 347/19 |
| 2006/0033770 A1 | 2/2006 | Yamasaki et al. |
| 2006/0262361 A1 * | 11/2006 | Nakano et al. ............... 358/504 |
| 2007/0057985 A1 | 3/2007 | Saito et al. |
| 2008/0094439 A1 * | 4/2008 | Yoshida et al. ................ 347/19 |
| 2008/0252673 A1 * | 10/2008 | Wada et al. ................... 347/12 |

FOREIGN PATENT DOCUMENTS

| | | |
|---|---|---|
| JP | 02-54676 A | 2/1990 |
| JP | 7-242025 A | 9/1995 |
| JP | 07-242025 A | 9/1995 |
| JP | 2005-022404 A | 1/2005 |
| JP | 2006-035652 A | 2/2006 |
| JP | 2006-218838 A | 8/2006 |

* cited by examiner

FIG. 13

DATA TABLE OF READ DENSITIES 212

| NUMBER OF ROW REGION | YELLOW | | | CYAN | | | LIGHT MAGENTA | | | |
|---|---|---|---|---|---|---|---|---|---|---|
| | DENSITY 1 | DENSITY 2 | DENSITY 3 | DENSITY 1 | DENSITY 2 | DENSITY 3 | DENSITY 1 | DENSITY 2 | DENSITY 3 | DENSITY 1 |
| 1 | xxx | xxx | xxx | xxx | xxx | xxx | xxx | xxx | xxx | xxx |
| 2 | xxx | xxx | xxx | xxx | xxx | xxx | xxx | xxx | xxx | xxx |
| 3 | xxx | xxx | xxx | xxx | xxx | xxx | xxx | xxx | xxx | xxx |
| ... | | | | | | | | | | |

152

| |
|---|
| NUMBER OF ROW REGIONS IN FRONT END PROCESS AREA |
| NUMBER OF ROW REGIONS IN NORMAL PROCESS AREA |
| NUMBER OF ROW REGIONS IN REAR END PROCESS AREA |
| |
| |
| CORRECTION VALUES FOR FRONT END PROCESS AREA |
| CORRECTION VALUES FOR NORMAL PROCESS AREA |
| CORRECTION VALUES FOR REAR END PROCESS AREA |
| FRONT END-SIDE COMBINED CORRECTION VALUES |
| REAR END-SIDE COMBINED CORRECTION VALUES |

155 { (last five rows)

PRINTING METHOD AND APPARATUS CORRECTING INK EJECTION IN EACH ROW REGION USING A COMBINED CORRECTION VALUE FOR CERTAIN COEXISTENT ROW REGIONS

CROSS-REFERENCE TO RELATED APPLICATION

The present application claims priority of Japanese Patent Application No. 2006-232803 filed on Aug. 29, 2006, the entire disclosure of which is herein incorporated by reference.

BACKGROUND

1. Technical Field

The present invention relates to printing methods and printing apparatuses.

2. Related Art

There are printing apparatuses, such as inkjet printers, that obtain measurement values by measuring the density of a test pattern that has been printed with this printing apparatus, and perform an adjustment of the ejected ink with these obtained measurement values (see for example JP-A-H02-54676). Among these printing apparatuses, there are also those that print while varying the transport amount. For example, a printing apparatus is known that prints while setting the transport amount for the end areas of the medium to a transport amount that is smaller than that for the middle area of the medium (see for example JP-A-H07-242025).

In the middle area, with respect to the transport direction, of the medium, the combination of row regions and nozzles is periodic. On the other hand, at the end areas, with respect to the transport direction, of the medium, the combination of row regions and nozzles is not likely to be periodic. As a result, even with correction values obtained from the same test pattern, the extent of the density correction is different between the area printed with a correction value corresponding to an end area and the area printed with a correction value corresponding to a middle area, so that there were cases in which a density difference occurs at the border area.

SUMMARY

The invention has been conceived in view of the above-described situation, and it is a main object thereof to suppress a deterioration of an image at the border between an area printed with a correction value for an end area and a portion area printed with a correction value for a middle area.

According to one aspect of the invention, a printing method is provided that comprises:

(A) determining a first correction value corresponding to a first print mode that is applied to a front end area, with respect to a transport direction, of a medium, the first print mode being for forming dot rows extending in a movement direction on a plurality of row regions lined up in the transport direction, by repeating a movement ejection operation of ejecting ink onto the medium while moving nozzles in the movement direction, which is perpendicular to the transport direction, and a transport operation of transporting the medium in the transport direction, the first correction value being for correcting an ejection amount of the ink in each row region individually;

(B) determining a second correction value corresponding to a second print mode that is applied to a middle area, with respect to the transport direction, of the medium, the second print mode being for forming dot rows extending in the movement direction on a plurality of row regions lined up in the transport direction, by repeating the movement ejection operation and the transport operation, the second correction value being for correcting an ejection amount of the ink in each row region individually;

(C) correcting the ejection amount of the ink in each row region individually, using a combined correction value that is obtained by combining the first correction value and the second correction value for a coexistent segment in which certain row regions and another row regions are coexistent, the certain row regions are row regions in which the dot rows are formed by the first print mode and the other row regions are row regions in which the dot rows are formed by the second print mode.

Other features of the present invention will become clear through the accompanying drawings and the following description.

BRIEF DESCRIPTION OF THE DRAWINGS

For a more complete understanding of the present invention and the advantages thereof, reference is now made to the following description taken in conjunction with the accompanying drawings.

FIG. 13 is a diagrammatic view of a data table of measurement values that is provided in a process host computer.

FIG. 14 is a diagrammatic view of a correction value storing section that is provided in a memory of the printer.

DESCRIPTION OF EXEMPLARY EMBODIMENTS

Figure 1:
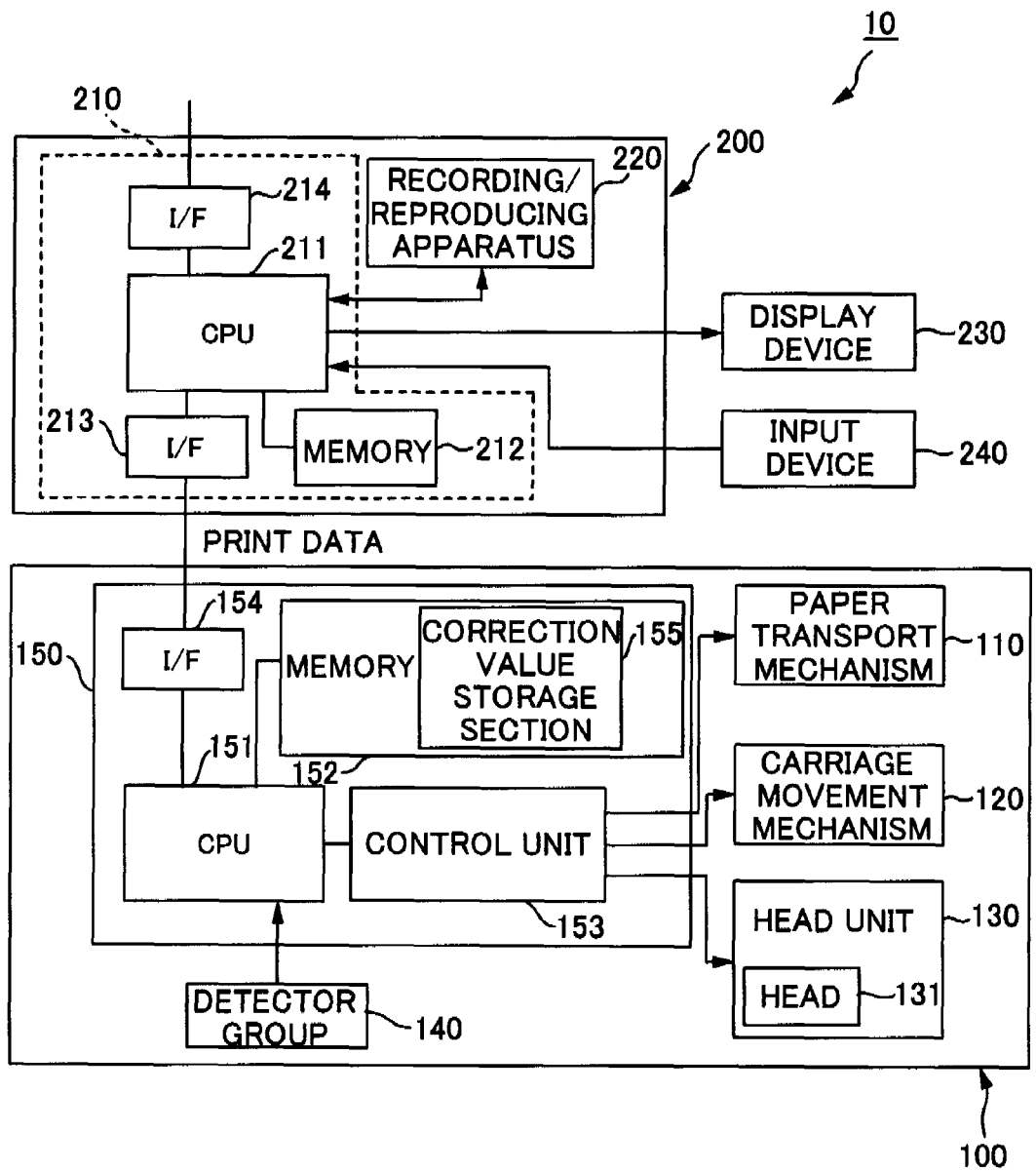
FIG. 1 is a block diagram illustrating the configuration of a printing system.

At least the following matters will be made clear by the present specification and the accompanying drawings.

It is possible to achieve a printing method such as the following:

a printing method comprising:

(A) determining a first correction value corresponding to a first print mode that is applied to a front end area, with respect to a transport direction, of a medium, the first print mode being for forming dot rows extending in a movement direction on a plurality of row regions lined up in the transport direction, by repeating a movement ejection operation of ejecting ink onto the medium while moving nozzles in the movement direction, which is perpendicular to the transport direction, and a transport operation of transporting the medium in the transport direction, the first correction value being for correcting an ejection amount of the ink in each row region individually;

(B) determining a second correction value corresponding to a second print mode that is applied to a middle area, with respect to the transport direction, of the medium, the second print mode being for forming dot rows extending in the movement direction on a plurality of row regions lined up in the transport direction, by repeating the movement ejection operation and the transport operation, the second correction value being for correcting an ejection amount of the ink in each row region individually;

(C) correcting the ejection amount of the ink in each row region individually, using a combined correction value that is obtained by combining the first correction value and the second correction value for a coexistent segment in which certain row regions and another row regions are coexistent, the certain row regions are row regions in which the dot rows are formed by the first print mode and the other row regions are row regions in which the dot rows are formed by the second print mode.

With this printing method, the combined correction value obtained by combining the first correction value and the second correction value is applied to the coexistent segment. In this way, degradation of the image at the border of the printing area with the correction value for the end area and the printing area with the correction value for the middle area can be suppressed.

In this printing method, it is preferable that a combination proportion of the first correction value and the second correction value is determined based on a position of the row region to be corrected in the coexistent segment.

With this printing method, deterioration of the image can be effectively suppressed.

In this printing method, it is preferable that the coexistent segment is a segment that is arranged further to a front end side of the medium, with respect to the transport direction, than the middle area, and is a segment where a ratio of the other row regions increases when approaching the middle area, and the proportion of the second correction value in the row regions near the middle area is greater than the proportion of the second correction value in the row regions further away from the middle area.

With this printing method, the row regions that are closer to the middle area are influenced more strongly by the second correction value than the row regions that are further away from the middle area. Therefore, a more suitable correction is achieved.

In this printing method, it is preferable that the proportion of the second correction value increases the closer the row regions are to the middle area.

With this printing method, the influence of the correction due to the second correction value becomes stronger, the closer the row regions are to the middle area. Therefore, an even more suitable correction is achieved.

In this printing method, it is preferable that the coexistent segment is divided into a plurality of blocks of a plurality of row regions in accordance with a distance from the middle area, and the proportion of the second correction value increases the closer the blocks are to the middle area.

With this printing method, the influence of the correction due to the second correction value becomes stronger the closer the blocks are to the middle area, so that a more suitable correction can be achieved. Moreover, the proportion of the second correction value is determined block by block, so that the control is simplified.

In this printing method, it is preferable that the combination proportion of the first correction value and the second correction value is constant, regardless of the position of the row region to be corrected in the coexistent segment.

With this printing method, the combination proportion of the first correction value and the second correction value is set uniformly in the coexistent segment, so that the control is simplified.

In this printing method, it is preferable that the first print mode is a print mode in which the dot rows are formed on the plurality of the row regions by repeating the movement ejection operation and a first transport operation of transporting the medium by a first transport amount, and the second print mode is a print mode in which the dot rows are formed on the plurality of the row regions by repeating the movement ejection operation and a second transport operation of transporting the medium by a second transport amount that is larger than the first transport amount.

With this printing method, the printing can be performed by a procedure that is suitable for both the end areas and the middle area of the medium.

In this printing method, it is preferable that the nozzles are constituted by nozzle rows that are lined up in the transport direction. With this printing method, deterioration of the image quality caused by variations in the characteristics among the nozzles can be prevented.

In this printing method, it is preferable that the first correction value is determined for each of the plurality of the row regions belonging to the front end area and the coexistent segment, with respect to the transport direction, of the medium, and a plurality of types of second correction values are determined in accordance with combinations of the row regions and the nozzles responsible for printing on those row regions.

With this printing method, the quality of the printed image can be increased.

In this printing method, it is preferable that the first correction value is determined based on measured density values of a first area of a test pattern that is printed by the same procedure as the front end area, with respect to the transport direction, of the medium, and the second correction value is determined based on measured density values of a second area of a test pattern that is printed by the same procedure as the middle area, with respect to the transport direction of the medium, the test pattern being printed for a plurality of periods that is determined by the combinations of the row regions and the nozzles.

With this printing method, the quality of the printed image can be increased.

It is also possible to achieve a printing apparatus such as the following:

a printing apparatus comprising:

(A) a nozzle movement mechanism that moves nozzles ejecting ink in a transport direction;

(B) a transport mechanism that transports a medium in a transport direction perpendicular to the movement direction;

(C) a memory that stores a combined correction value obtained by combining a first correction value corresponding to a first print mode and a second correction value corresponding to a second print mode, the first print mode being a print mode that is applied to a front end area, with respect to the transport direction, of the medium, the first correction value being for correcting an ink ejection amount for individual row regions that are lined up in the transport direction, the second print mode being a print mode that is applied to a middle area, with respect to the transport direction, of the medium, the second correction value being for correcting an ink ejection amount for individual row regions that are lined up in the transport direction; and (D) a controller that controls a movement ejection operation and a transport operation, and corrects the ink ejection amount in each row region individually, the movement ejection operation being an operation of ejecting ink while moving the nozzles, the transport operation being an operation of transporting the medium in the transport direction, a correction of the ink ejection amount being carried out in a coexistent segment where certain row regions and another row regions are coexistent using the combined correction value, the certain row regions being row regions in which dot rows extending in the movement direction are formed by the first print mode and the other row regions being row regions in which dot rows extending in the movement direction are formed by the second print mode.

It is also possible to achieve a printing apparatus such as the following:

A printing apparatus comprising:

(A) a nozzle movement mechanism that moves nozzles ejecting ink in a transport direction;

(B) a transport mechanism that transports a medium in a transport direction perpendicular to the movement direction;

(C) a memory that stores a first correction value corresponding to a first print mode and a second correction value corresponding to a second print mode, the first print mode being a print mode that is applied to a front end area, with respect to the transport direction, of the medium, the first correction value being for correcting an ink ejection amount for individual row regions that are lined up in the transport direction, the second print mode being a print mode that is applied to a middle area, with respect to the transport direction, of the medium, the second correction value being for correcting an ink ejection amount for individual row regions that are lined up in the transport direction; and (D) a controller that controls a movement ejection operation and a transport operation, and corrects the ink ejection amount in each row region individually, the movement ejection operation being an operation of ejecting ink while moving the nozzles, and the transport operation being an operation of transporting the medium in the transport direction, a correction of the ink ejection amount in a coexistent segment where certain row regions and another row regions are coexistent is carried out using a combined correction value that is obtained by combining the first correction value and the second correction value, the certain row regions being row regions in which dot rows extending in the movement direction are formed by the first print mode and the other row regions being row regions in which dot rows extending in the movement direction are formed by the second print mode.

It is also possible to achieve a program such as the following:

A storage medium storing a program including the following code:

(A) code for letting a controller perform control of a movement ejection operation and control of a transport operation, wherein the movement ejection operation is an operation of ejecting ink while moving the nozzles in a movement direction, and the transport operation is an operation of transporting a medium in a transport direction that is perpendicular to the movement direction;

(B) code for reading with the controller from a memory a combined correction value that is obtained by combining a first correction value corresponding to a first print mode and a second correction value corresponding to a second print mode;

wherein the first print mode is a print mode that is applied to a front end area, with respect to the transport direction, of the medium, the first correction value being for correcting an ink ejection amount for individual row regions that are lined up in the transport direction; and wherein the second print mode is a print mode that is applied to a middle area, with respect to the transport direction, of the medium, the second correction value being for correcting an ink ejection amount for individual row regions that are lined up in the transport direction;

(C) code for letting the controller correct the ink ejection amount in a coexistent segment where first row regions and second row regions are coexistent, using the combined correction value;

wherein the correction of the ink ejection amount is carried out for each row region individually, the first row regions being row regions in which dot rows extending in the movement direction are formed by the first print mode and the second row regions being row regions in which dot rows extending in the movement direction are formed by the second print mode.

Printing System 10

First, a printing system 10 is explained. The printing system 10 is for printing an image on paper, and as shown in FIG. 1, it may include an inkjet printer 100 (referred to in the following simply as "printer 100") and a host computer 200. The following is an explanation of a printing apparatus. A controller of the printing apparatus controls the printing apparatus with a printer driver 216 (see FIG. 5), in a manner described further below. Accordingly, if the host computer 200 executes the printer driver 216, the combination of the printer 100 and the host computer 200 corresponds to a printing apparatus. Moreover, if the printer-side controller 150 has the same function as the printer driver 216, that is, if the printer 100 can carry out printing on a sheet of paper S on its own, then the printer 100 corresponds to a printing apparatus.

Printer 100

The printer 100 includes a paper transport mechanism 110, a carriage movement mechanism 120, a head unit 130, a detector group 140, and a printer-side controller 150.

Figure 2:
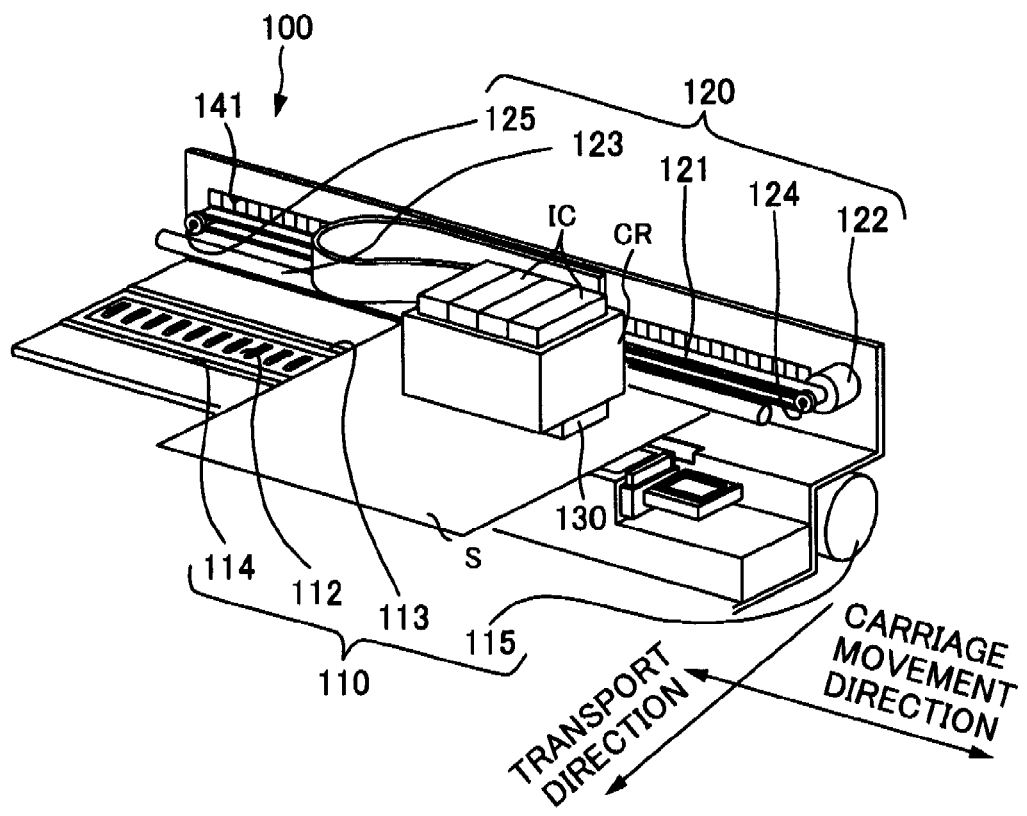
FIG. 2 is a perspective view illustrating the configuration of a printer.
Figure 3:
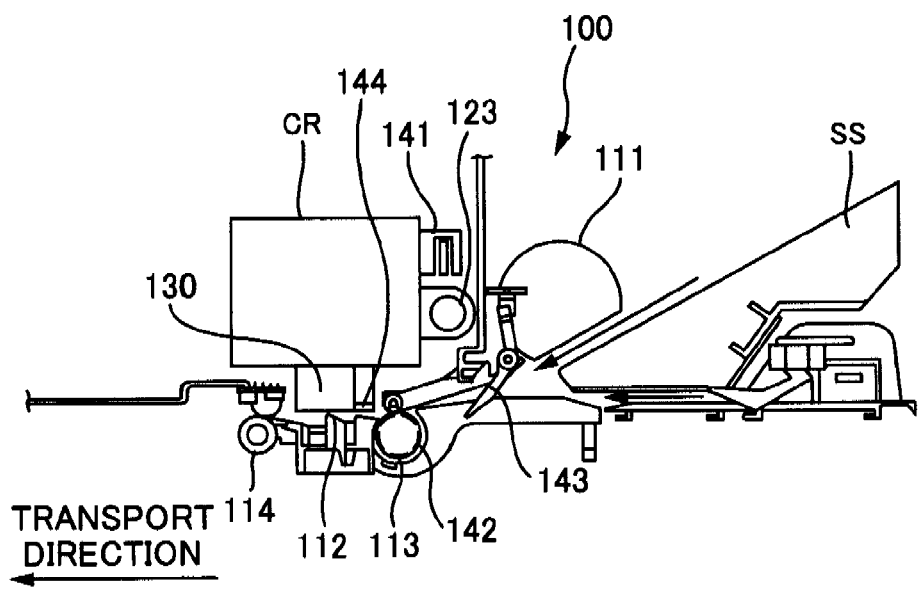
FIG. 3 is a lateral view illustrating the configuration of the printer.

The paper transport mechanism 110 corresponds to a transport mechanism that transports a medium in a transport direction. This transport direction is a direction intersecting the carriage movement direction, which is explained next. As shown in FIGS. 2 and 3, the paper transport mechanism 110 includes a paper supply roller 111 that is arranged at a predetermined position above a paper stocker SS, a platen 112 supporting the paper S from its rear side, a transport roller 113 arranged upstream in the transport direction from the platen 112, a paper discharge roller 114 arranged downstream in the transport direction from the platen 112, and a transport motor 115 serving as a driving source for the transport roller 113 and the paper discharge roller 114. With this paper transport mechanism 110, paper S that is held in the stocker is fed sheet by sheet with the paper supply roller 111. Moreover, the paper S is fed to the platen 112 by the transport roller 113 and after being printed, the paper S is fed in the transport direction by the paper discharge roller 114.

The carriage movement mechanism 120 is for moving the carriage CR in the carriage movement direction. This carriage CR is a member to which ink cartridges IC and a head unit 130 are attached. The carriage movement directions include the movement direction from one side to the other side as well as the movement direction back from the other side to the one side. Here, the head unit 130 includes a plurality of nozzles Nz (see FIG. 4). Therefore, the carriage movement mechanism 120 corresponds to a nozzle movement mechanism, and the carriage movement directions correspond to nozzle movement directions. The carriage movement mechanism 120 includes a timing belt 121, a carriage motor 122, a guide shaft 123, a drive pulley 124, and an idler pulley 125. The timing belt 121 is connected to the carriage CR and is suspended between the drive pulley 124 and the idler pulley 125. The carriage motor 122 is a driving source that rotates the drive pulley 124. The guide shaft 123 is a member for guiding the carriage CR in the carriage movement directions. With this carriage movement mechanism 120, it is possible to move the carriage CR in the carriage movement directions by operating the carriage motor 122.

Figure 4:
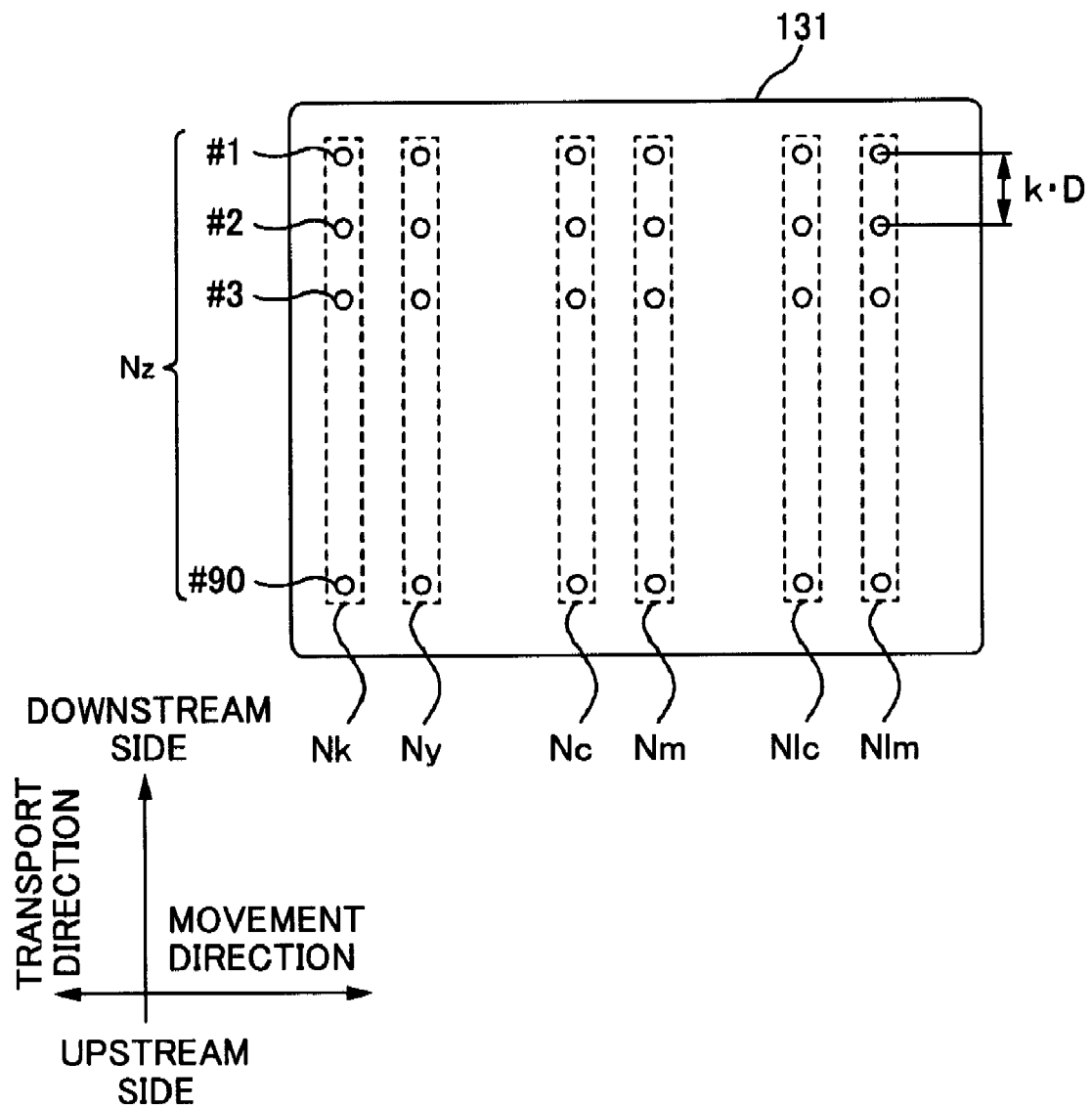
FIG. 4 is a diagram illustrating the nozzle rows of the head.

The head unit 130 includes a head 131 that ejects ink onto the paper S. While being attached to the carriage CR, the head 131 faces the platen 112. As shown in FIG. 4, a plurality of nozzles Nz for ejecting ink are provided in the face of the head 131 that opposes the platen 112 (the nozzle face). These nozzles Nz are grouped together by the types of ink that they eject, and each of these groups constitutes a nozzle row. That is to say, the nozzle rows correspond to nozzle groups that are each constituted by a plurality of nozzles Nz that eject ink of the same type. The head 131 shown as an example includes a black ink nozzle row Nk, a yellow ink nozzle row Ny, a cyan ink nozzle row Nc, a magenta ink nozzle row Nm, a light cyan ink nozzle row Nlc, and a light magenta ink nozzle row Nlm. While the head 131 is attached, these nozzle rows Nk to Nlm are arranged at positions shifted in the carriage movement direction.

The nozzle rows include n (for example, n=90) nozzles Nz. The plurality of nozzles Nz belonging to one nozzle row are arranged at a constant spacing (nozzle pitch: k·D) along the transport direction. Here, D is the minimum dot pitch in the transport direction, that is, the spacing of the dots formed on the paper S at the highest resolution. Moreover, k is a coefficient that expresses the relation between the minimum dot pitch D and the nozzle pitch, and is set to an integer of 1 or greater. For example, if the nozzle pitch is 180 dpi (a spacing of 1/180 inch) and the dot pitch in the transport direction is 720 dpi (1/720), then k=4. Moreover, varying amounts of ink (ink droplets) can be ejected from the individual nozzles Nz.

Thus, a configuration is achieved in which the plurality of nozzles Nz are arranged in the transport direction, constituting nozzle rows, a plurality of these nozzle rows are arranged at various positions in the transport direction, and the nozzle rows eject ink of different colors. Thus, it is possible to eject a large number of types (colors) of ink, even when the area of the nozzle face is limited.

The detector group 140 is for monitoring the state of the printer 100. As shown in FIG. 2 and FIG. 3, this detector group 140 includes a linear encoder 141, a rotary encoder 142, a paper detector 143, and a paper width detector 144.

The printer-side controller 150 controls the printer 100 and includes a CPU 151, a memory 152, a control unit 153, and an interface section 154. The CPU 151 is an arithmetic processing device for carrying out overall control of the printer 100. The memory 152 is for ensuring a working region and a region for storing the programs for the CPU 151, for instance, and is constituted by storage elements such as a RAM, an EEPROM, or a ROM. The CPU 151 controls the various sections to be controlled via the control unit 153, in accordance with a computer program stored in the memory 152. Consequently, the control unit 153 outputs various kinds of signals, based on commands from the CPU 151. Together with the host-side controller 210, this printer-side controller 150 corresponds to a controller that controls a movement ejection operation of ejecting ink while moving the nozzles Nz in the carriage movement directions and a transport operation of transporting the paper S in the transport direction. In this situation, the printer-side controller 150 is responsible for the direct control of the various sections of the printer 100, whereas the host-side controller 210 is responsible for a correction of the image density (correction of the ink ejection amount) based on correction values. A partial region of the memory 152 is used as a correction value storage region 155. In the correction value storage region 155, correction values (explained later) are stored that are used when correcting the density of the printed image for each row region individually.

Host Computer 200

The host computer 200 includes a host-side controller 210, a recording/reproducing apparatus 220, a display device 230, and an input device 240. Of these, the host-side controller 210 includes a CPU 211, a memory 212, a first interface section 213, and a second interface section 214. The CPU 211 is an arithmetic processing device for carrying out the overall control of the computer. The memory 212 is for ensuring a working region and a region for storing the computer programs used by the CPU 211. The CPU 211 performs various controls in accordance with the computer programs stored in the memory 212. The first interface section 213 performs the exchange of data with the printer 100, and the second interface section 214 performs the exchange of data with other devices (such as a scanner) besides the printer 100.

Figure 5:
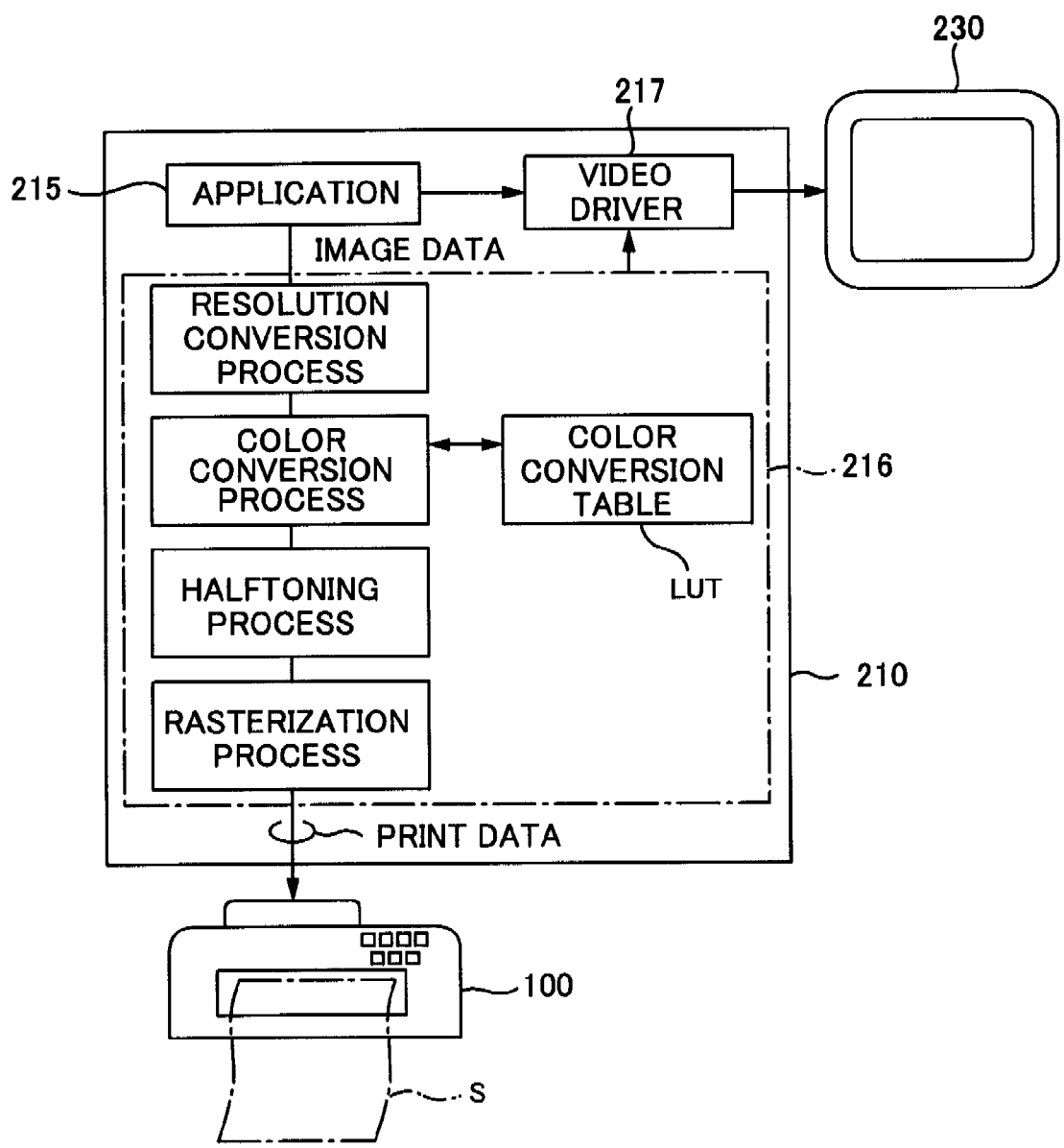
FIG. 5 is a diagrammatic view illustrating a computer program stored in the memory of a host computer.

As shown in FIG. 5, examples of computer programs stored in the memory 212 of the host-side computer 210 are an application program 215, a printer driver 216, and a video driver 217. The application program 215 is for letting the host-computer 200 carry out the desired operation. The printer driver 216, which is for controlling the printer 100, generates print data based on image data from the application program 215 for example, and sends the print data to the printer 100. The video driver 217 is for displaying display data from the application program 215 or the printer driver 216 on the display device 230.

The following is an explanation of the print data sent from the printer driver 216. Print data is data in a format that can be interpreted by the printer 100, and includes various kinds of command data as well as dot formation data. "Command data" refers to data for instructing the printer 100 to carry out a specific operation. As such command data, there is for example paper supply data instructing paper supply, transport amount data indicating the transport amount, and paper discharge data instructing paper discharge. Moreover, dot formation data is data relating to the dots formed on the paper S (data such as the color and the size of the dots). This dot formation data is constituted by a plurality of dot tone values that are determined individually for each unit region. A "unit region" denotes a region of rectangular shape that is determined virtually on the medium, such as the paper S, and its size and shape are determined in accordance with the printing resolution. For example, if the printing resolution is 720 dpi (in the carriage movement direction)×720 dpi (in the transport direction), then the unit region is a square-shaped region that is about 35.28 μm×35.28 μm ($\approx 1/720$ inches×$1/720$ inches). The dot tone value indicates the size of the dots that are formed in the unit region. In this printing system 10, the dot tone values are given as two-bit data. Therefore, it is possible to control the formation of the dots with four gradations in each single unit region.

Printing Operation

The Operation on the Side of the Computer 200

A printing operation is carried out for example as the user executes a printing command in the application program 215. When the printing command of the application program 215 is executed, the host-side controller 210 generates image data to be printed. This image data is converted into print data by the host-side controller 210 through execution of the printer driver 216. The conversion into print data is carried out through a resolution conversion process, a color conversion process, a halftoning process, and a rasterization process. Consequently, the printer driver 216 includes code for carrying out these processes.

The resolution conversion process is a process for converting the resolution of the image data to the printing resolution. It should be noted that the "printing resolution" is the resolution when printing on the paper S. The color conversion process is a process for converting the RGB pixel data of the RGB image data into CMYK data having tone values of many levels (for example, 256 levels) expressed in CMYK color space. The color conversion process is carried out by looking up a table that correlates RGB tone values and CMYK tone values (color conversion lookup table LUT). The printer 100 prints using six colors of ink, namely cyan (C), light cyan (LC), magenta (M), light magenta (LM), yellow (Y), and black (K). Therefore, in this color conversion process, data is generated for each of these colors. It should be noted that the correction values stored in the correction value storage region 155 are used in the color conversion process (this is explained later).

Figure 6:
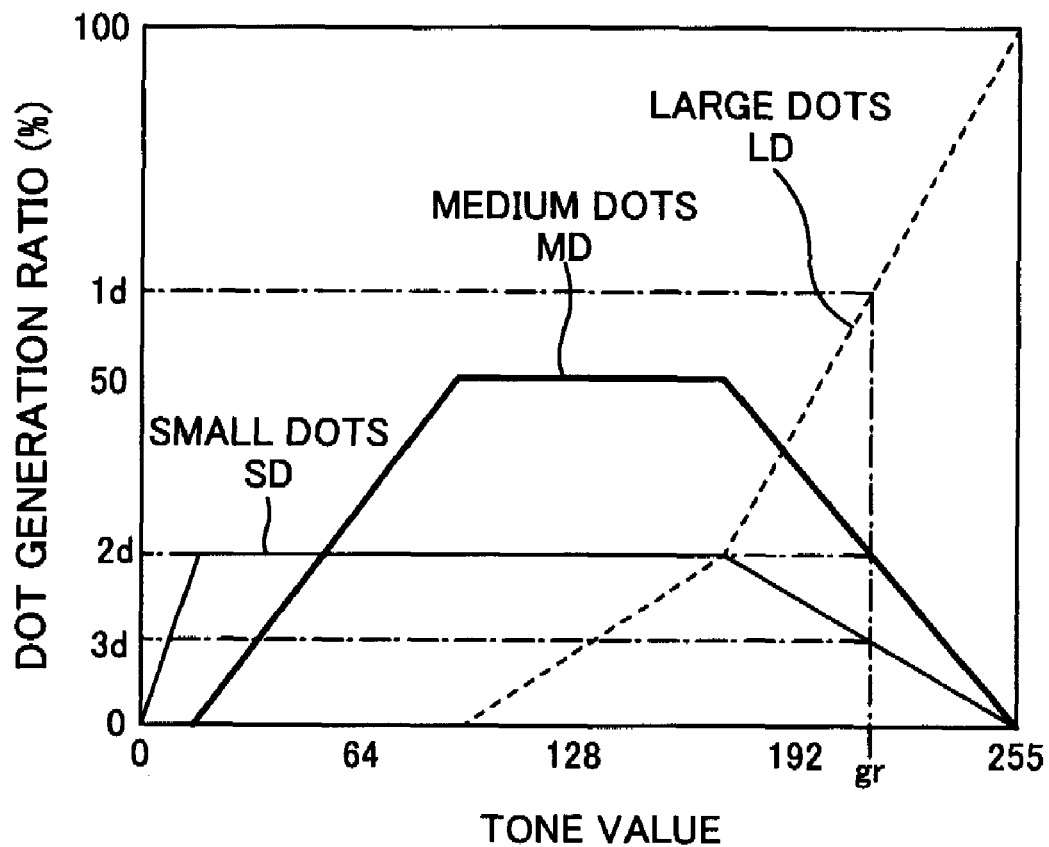
FIG. 6 is a diagram schematically illustrating halftone processing.

The halftoning process is a process for converting CMYK pixel data having many tone values into dot tone values having few tone values, which can be expressed by the printer 100. More specifically, for each unit region, one of the four tone values "no dot formation", "small dot formation", "medium dot formation" and "large dot formation" is selected. The generation rate of these dots is determined in accordance with the tone value. For example, as shown in FIG. 6, in a unit region for which the tone value gr is specified, the formation rate of large dots is 1d, the formation rate of medium dots is 2d, and the formation rate of small dots is 3d. It is possible to use dithering, gamma correction, and error diffusion and the like for such a halftoning process. The rasterization process is a process for changing the dot tone value that has been obtained by the halftoning process into the data order in which it is to be transferred to the printer 100. Thus, the dot formation data is generated for each color. This dot formation data constitutes the aforementioned command data as well as the print data and is sent to the printer 100.

The Operation on the Side of the Printer 100

On the side of the printer 100, the printer-side controller 150 carries out various processes on the basis of the received print data. It should be noted that the processes performed on the side of the printer 100 as explained below are accomplished by the printer-side controller 150 executing a computer program stored in the memory 152. Consequently, this computer program includes code for executing the various processes.

Figure 7:
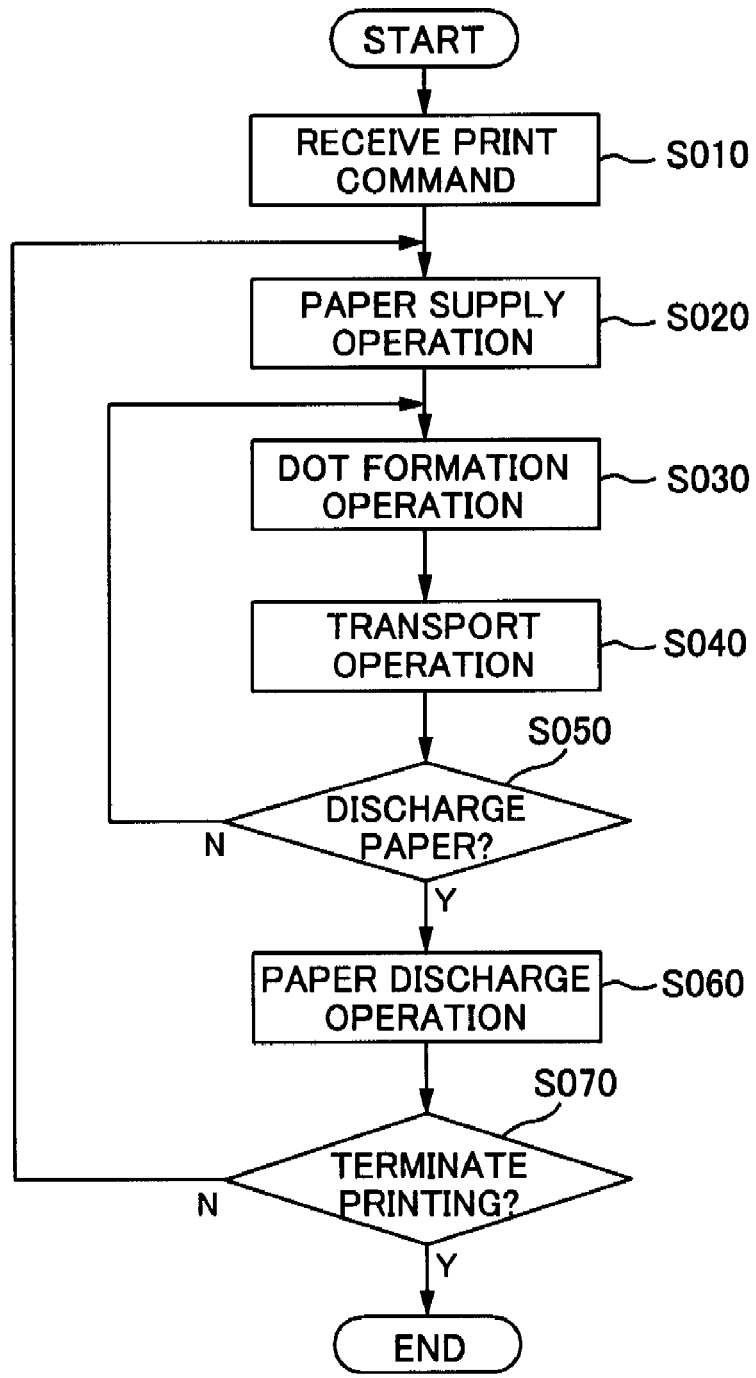
FIG. 7 is a flowchart illustrating a printing operation on the printer side.

As shown in FIG. 7, when the printer-side controller 150 receives a print command in the print data (S010), it carries out a paper supply operation (S020), a dot formation operation (S030), a transport operation (S040), a paper discharge judgment (S050), a paper discharge operation (S060), and a print termination judgment (S070). The paper supply operation is an operation for moving the paper S, which is the medium to be printed, and positioning it at a print start position (the so-called indexing position). In this paper supply operation, the printer-side controller 150 drives the transport motor 115, thus causing the paper supply roller 111 and the transport roller 113 to rotate. The dot formation operation is an operation for forming dots on the paper S. In this dot formation operation, the printer-side controller 150 drives the carriage motor 122 and outputs control signals to the head 131. Thus, the nozzles Nz move together with the carriage CR and eject ink intermittently. This dot formation operation corresponds to a movement ejection operation in which ink is ejected while moving the plurality of nozzles Nz. The transport operation is an operation for moving the paper S in the transport direction. In this transport operation, the printer-side controller 150 drives the transport motor 115, thus causing the transport roller 113 and the paper discharge roller 114 to rotate. Due to this transport operation, it is possible to form dots at positions that are different to those of the dots formed in the previous dot formation operation. The paper discharge judgment is an operation for judging whether the printed paper S is to be discharged or not. The paper discharge operation is a process for discharging the paper S and is carried out under the condition that the previous paper discharge judgment has led to the judgment "discharge". In this paper discharge process, the printer-side controller 150 drives the transport motor 115, thus causing the transport roller 113 and the paper discharge roller 114 to rotate. The print stop judgment is for judging whether the printing is to be continued.

During the printing of the image on the paper S, the dot formation operation (S030) and the transport operation (S040) are carried out repeatedly. When the ink ejected from the nozzles Nz lands on the paper S, dots are formed on the paper S. Thus, dot rows (also referred to as "raster lines" in the following) made of a plurality of dots extending in the carriage movement direction are formed on the surface of the paper S. Then, since the dot formation operation and the transport operation are carried out repeatedly, a plurality of raster lines are formed in the transport direction. Thus, the image printed on the paper S is constituted by a plurality of raster lines that are adjacent in the transport direction.

Interlaced Printing

With this printer 100, an image is printed by ejecting ink while the nozzles Nz are moving. Now, various components, such as the nozzles Nz, are subject to irregularities due to processing and assembly. Due to these irregularities, also such characteristics as the trajectory and the ejection amount of the ink (referred to below as "ejection characteristics") are subject to irregularities. In order to ease the irregularities in the ejection characteristics, printing according to an interlacing method (referred to below as "interlaced printing") is carried out. Here, "interlaced printing" refers to printing in which raster lines that are recorded in one pass sandwich raster lines that have not been recorded in the first pass. A "pass" means a single dot formation operation, that is, a single movement ejection operation. In the example of interlaced printing shown in FIG. 8, one nozzle row having eight nozzles Nz is shown for the sake of convenience. Moreover, even though it looks as if the nozzle row moves with respect to the paper S, the figure shows the relative positions between the nozzle row and the paper S. That is to say, in the actual printer 100, the paper S moves in the transport direction.

In the interlaced printing, a front end process, a normal process, and a rear end process are performed. The front end process is a printing method that is suitable for the front end area of the paper S (the area at the downstream end in the transport direction), and prints while transporting the paper S by a transport amount that is smaller than in the normal process. In this example, the transport amount is set to 1·D, and the dot formation operation of four passes is carried out. Moreover, one raster line is formed by a single pass. For example, the first raster line (the leading raster line) is formed with ink that is ejected from the first nozzle Nz (#1) in the fourth pass. And the second to fifth raster lines are formed with ink that is ejected from the second nozzle Nz (#2).

The normal process is a printing method that is suitable for the middle area excluding the front end area and the rear end area (the area at the upstream end) of the paper S. In the normal process, every time the paper S is transported in the transport direction by a constant transport amount, each of the nozzles Nz record a raster line immediately above the raster line that was recorded in the immediately prior pass. In order to perform the recording with a constant transport amount, it is required that the following conditions are satisfied. That is to say, the conditions that need to be satisfied are that (1) the nozzle number N (integer) from which ink can be ejected is coprime to the coefficient k, and (2) the transport amount F is set to N·D (where D is the spacing at the highest resolution in transport direction). Here, N=7, k=4, F=7·D is set in order to satisfy these conditions (D=720 dpi). With respect to the groups of raster lines formed by this normal process, the combination of nozzles Nz responsible for the raster lines is periodic. That is to say, raster lines formed by a combination of the same nozzles Nz appear every predetermined number of lines (this is explained below).

The rear end process is a printing method that is suitable for the rear end area of the paper S, and prints while transporting the paper S by a transport amount that is smaller than in the normal process. In the example in FIG. 8, the transport amount is set to 1·D, and the dot formation operation of four passes is carried out.

With this interlaced printing, a front end process, a normal process and a rear end process are carried out, and the transport amount is set to a suitable amount for each of these processes. Therefore, printing can be carried out with a procedure that is suitable for the position of the paper S. For example, at the end areas of the paper S, a deterioration of the image quality that is caused by transport irregularities is prevented by making the transport amount smaller than in the middle area of the paper S. Moreover, at the middle area of the paper S, the paper S is transported by the maximum transport amount at which raster lines can be formed in each of the row regions, and the printing process is sped up.

Figure 8:
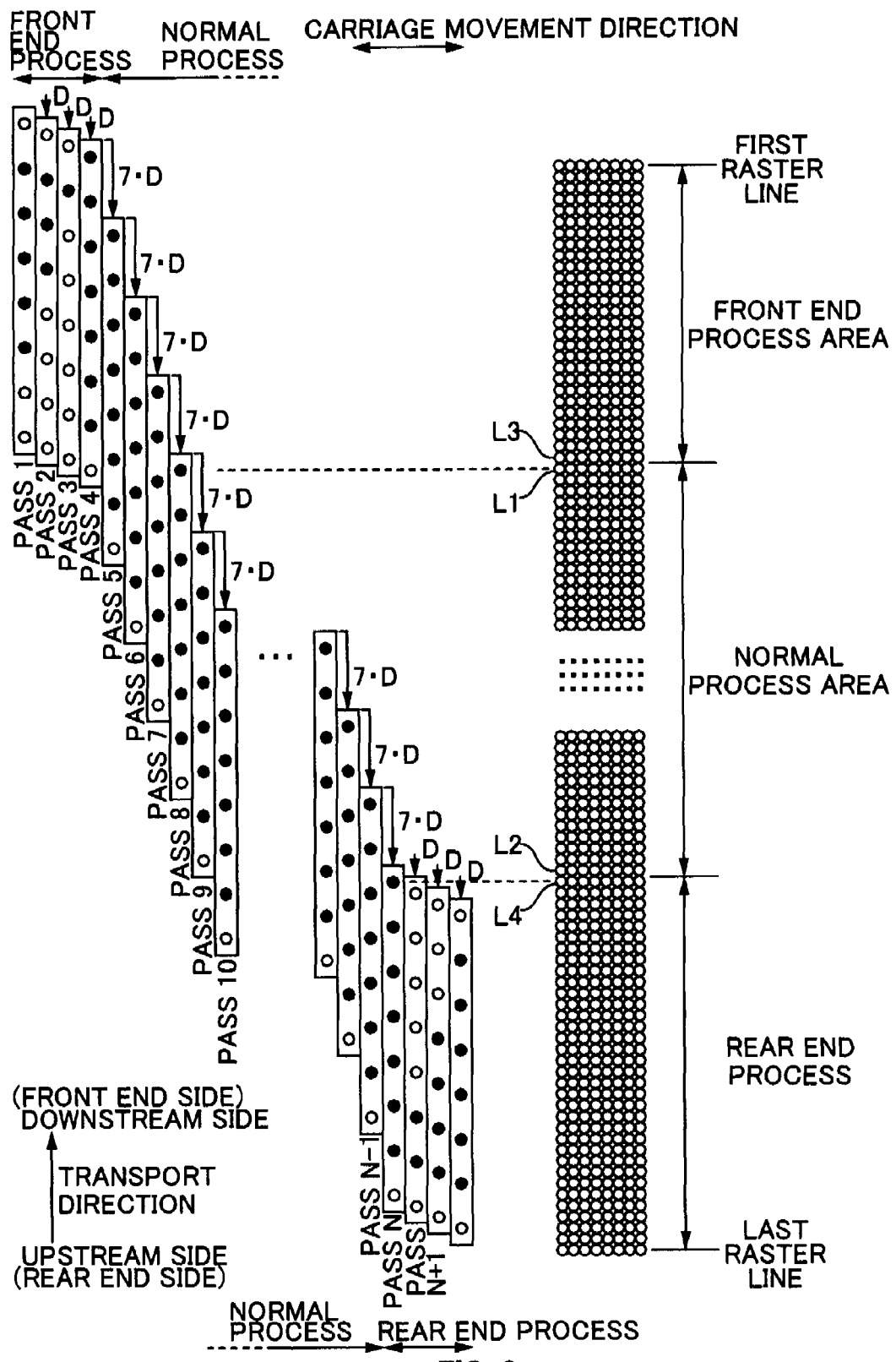
FIG. 8 is a diagram illustrating an example of interlaced printing.

It should be noted that in the following explanations, the area where raster lines are formed only by the normal process is referred to as "normal process area". In the example of FIG. 8, the raster lines that are upstream from the raster line L1 formed by the nozzle Nz (#1) in the eighth pass belong to the normal process area. Moreover, the raster lines (up to the raster line L2) downstream from the raster line L4 that is formed by the nozzles Nz (#1) in the n-th path (the last transport operation with a transport amount of 7·D) belong to the normal process area. Moreover, the raster lines belonging to the regions outside the normal process area constitute a front end process area and a rear end process area. That is to say, the front end process area is constituted by a plurality of raster lines from the raster line L3 adjacent to the raster line L1 on the downstream side to the first raster line. Similarly, the rear end process area is constituted by the raster lines from the raster line L4 to the last raster line. Consequently, the front end process area includes a segment that is constituted only by raster lines that are formed by the front end process and a segment in which raster lines formed by the front end process are coexistent with raster lines formed by the normal process. Similarly, the rear end process area includes a segment that is constituted only by raster lines that are formed by the rear end process and a segment in which raster lines formed by the rear end process are coexistent with raster lines formed by the normal process. It should be noted that these segments are explained later.

Correction Values

Density Irregularities in the Printing Image

In this printer 100, as explained above, an image is printed by repeating a dot formation operation and a transport operation. Moreover, by carrying out interlaced printing, the ejection characteristics of the individual nozzles Nz are eased and the image quality is improved. However, in recent years there is a high demand for ever increasing image quality and there is a demand for a further improvement of quality, also for images obtained by interlaced printing. The following is an explanation of density irregularities (banding) in printed images that may become a cause for a decrease in quality. Such density irregularities can be seen as stripes that are parallel to the carriage movement direction (referred to simply as "horizontal stripes" in the following). That is to say, they are density irregularities that appear in the transport direction of the paper S.

Figure 9A:
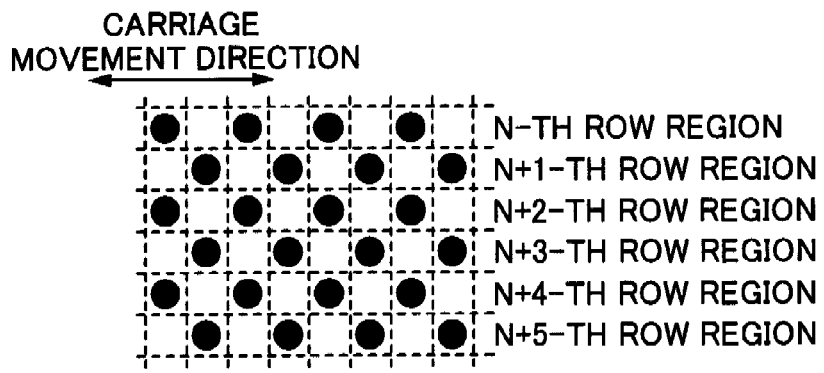
FIG. 9A is a diagram illustrating dot groups formed with ideal ejection characteristics.

In the example of FIG. 9A, the ejection characteristics are ideal, so that the ink that is ejected from the nozzles Nz lands with high positional precision on the unit regions determined virtually on the paper S. That is to say, the centers of the unit regions coincide with the centers of the dots. Moreover, the raster lines are constituted by a plurality of dots that are lined up in the carriage movement direction. In this example, a comparison of the image density of the row regions in the printed image shows that the image density in the row regions is uniform. Here, a "row region" means a region that is constituted by a plurality of unit regions that are lined up in the movement direction of the nozzles Nz (carriage movement direction). For example, in the case of a printing resolution of 720 dpi×720 dpi, a row region is a stripe-shaped region with a width of 35.28 µm ($\approx 1/720$ inches) in the transport direction. Moreover, since the image is constituted by a plurality of raster lines that are adjacent in the transport direction, also a plurality of row regions are arranged adjacent to each other in the transport direction of the paper S (the direction perpendicular to the carriage movement direction). In the following explanations, individual images broken up into row regions are also referred to as "image fragments." Here, the raster lines are rows of dots that are obtained by the landing of ink. On the other hand, image fragments are obtained by cutting out row regions from a printed image. With regard to this aspect, raster lines are different from image fragments.

Figure 9B:
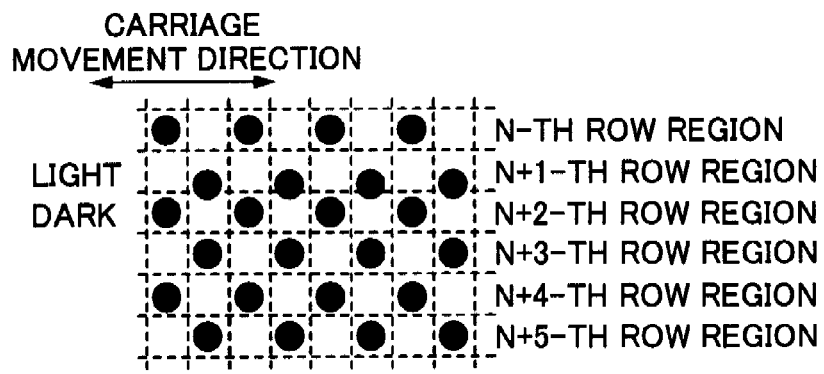
FIG. 9B is a diagram illustrating the influence of variations in ejection characteristics.

In the example of FIG. 9B, due to the influence of the ejection characteristics, the raster line corresponding to the $n+1^{th}$ row region is formed at a position that is shifted from its proper position toward the $n+2^{th}$ row region (downward side in FIG. 9B). Accordingly, there is a variation in the density of the image fragments. For example, the density of the image fragment corresponding to the $n+1^{th}$ row region is lower than the density of an image fragment corresponding to a standard row region (for example the $n^{th}$ row region and the $n+3^{th}$ row region). Moreover, the density of the image fragment corresponding to the $n+2^{th}$ row region is darker than the density of an image fragment corresponding to a standard row region.

Figure 10:
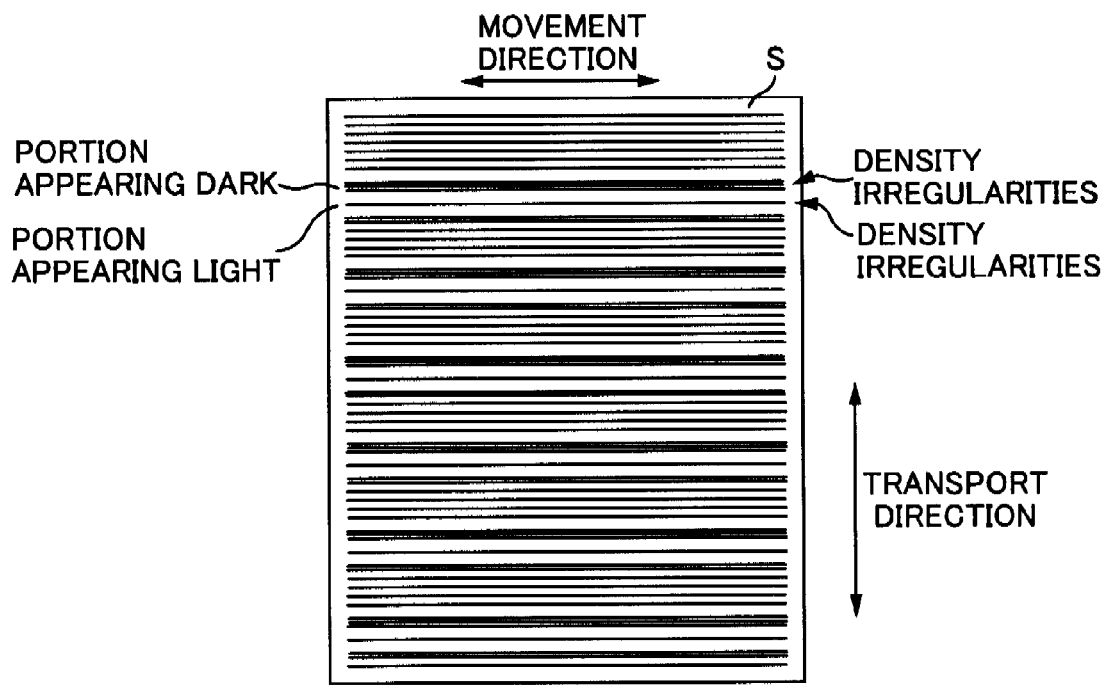
FIG. 10 is a diagrammatic view illustrating density irregularities.

As shown in FIG. 10, variations in the density of the image fragments are macroscopically visible as density irregularities in the form of horizontal stripes. That is to say, the image fragments with a relatively wide spacing between adjacent raster lines macroscopically appear lighter, whereas image fragments with a relatively narrow spacing between adjacent raster lines macroscopically appear darker. These density irregularities are a cause for degradation of the quality of the printed image. It should be noted that this cause of density non-uniformities also applies to the other ink colors as well. Moreover, if there is a tendency for a variation even in only one of the six aforementioned colors, then density irregularities will appear in printed multi-color images.

Overview of Correction Values

In order to correct the density irregularities individually by row region, the printer 100 stores a correction value for each row region in which a raster line is formed and corrects the density of the printed image individually for each row region. For example, for row regions that have a tendency of appearing darker than normal, a correction value is stored with which the image fragment of this row region is set to be formed lighter. On the other hand, for row regions that have a tendency of appearing lighter than normal, a correction value is stored with which the image fragment of this row region is set to be formed darker. These correction values are looked up in the processing with the printer driver 216, for example. For example, the CPU 211 of the host computer 200 may correct the multi-gradation CMYK pixel data based on the correction values during the color conversion process. Then, halftone processing is performed with the corrected CMYK pixel data. In other words, the tone values are corrected based on the correction values. Thus, the amount of ejected ink is adjusted such that density variations in the image fragments are suppressed. It should be noted that in FIG. 9B, the reason why the image fragment corresponding to the $n+2^{th}$ row region is darker is that the spacing between the adjacent raster lines is narrower than the proper spacing. More specifically, the $n+1^{th}$ raster line, which should be formed in the middle, with respect to the transport direction, of the $n+1^{th}$ row region is shifted towards the $n+2^{th}$ row region, so that the corresponding image fragment becomes darker. Therefore, taking the image fragment as a reference, it is necessary to take the raster lines formed by the adjacent row regions into consideration. That is to say, it is necessary to take the combination of the nozzles Nz responsible for the adjacent row regions into consideration.

Figure 11:
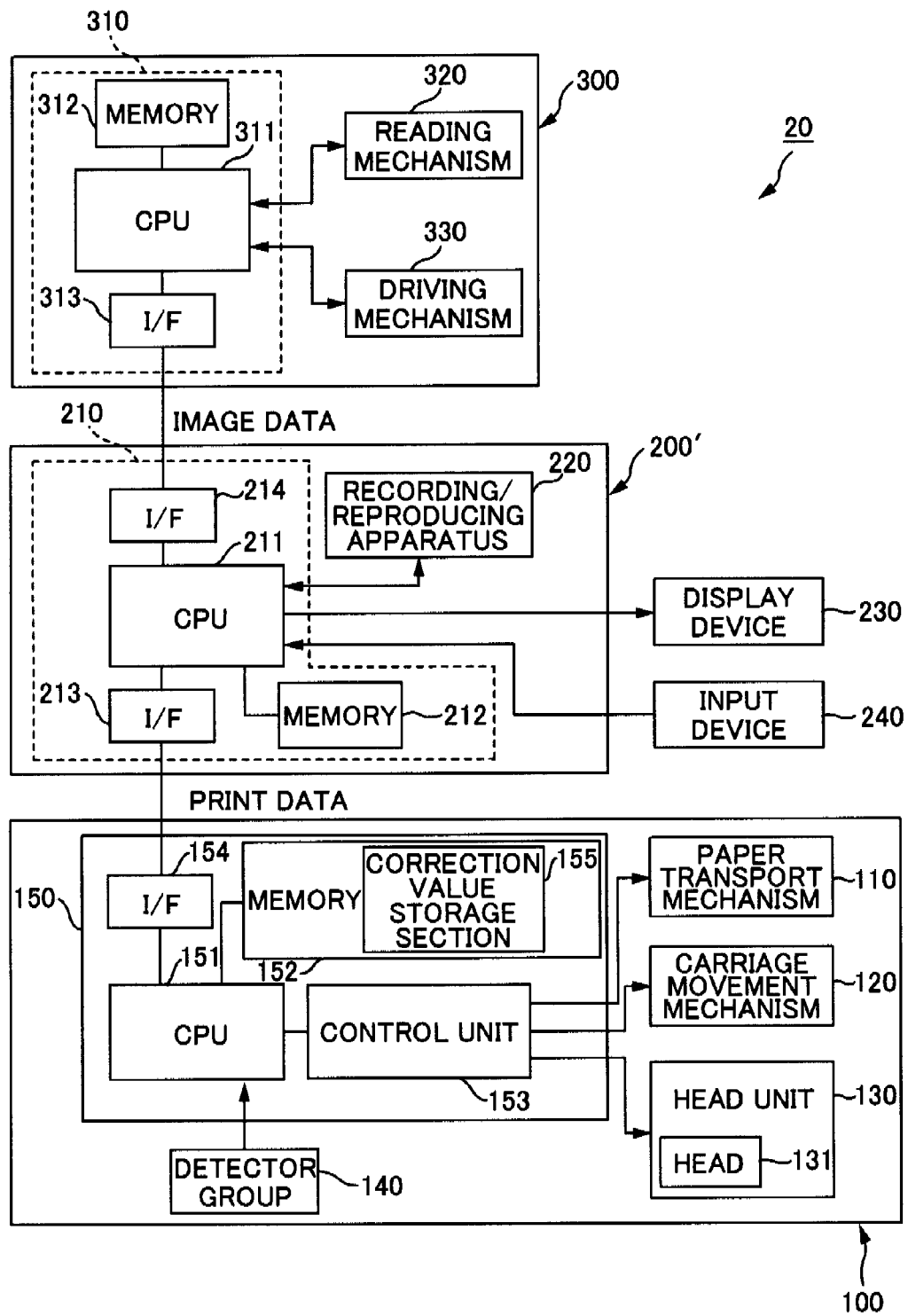
FIG. 11 is a block diagram illustrating the configuration of a correction value setting system.

The correction values of the individual row regions are set based on measurement values of the density as measured with a scanner 300 (see FIG. 11). For example, in an inspection step at the printer manufacturing plant, first a test pattern CP (see FIG. 16) is printed with the printer 100 and the density of this printed test pattern CP is read in with the scanner 300. Then, based on the measurement values (read densities) corresponding to the various image fragments, a correction value is obtained for each row region. The obtained correction values are stored in the correction value storage region 155 of the printer-side controller 150. The printer 100 in which these correction values are stored is then used by the user. In this situation, the host computer 200 (more specifically, the host-side controller 210 executing the printer driver 216) connected to the printer 100 corrects the multi-gradation pixel data for each of the row regions, using the correction values read in from the correction value storage region 155. Furthermore, the host-side controller 210 generates the print data based on the corrected tone values. The print data is sent to the printer 100. As a result, the image printed by the printer 100 becomes an image of higher image quality, in which the horizontal stripe-shaped density irregularities are reduced. That is to say, a density correction can be performed that corrects variations in the characteristics of the nozzles Nz responsible for adjacent row regions.

In the above-described normal process area, the combination of the row regions and nozzles Nz is periodic. This is due to the fact that the paper S is transported by a predetermined feed amount. Therefore, a number of correction values used during printing of the normal process area is determined that corresponds to one period. In the example of FIG. 8, one period corresponds to seven row regions. Therefore, seven correction values used during printing of the normal process area (also referred to simply as "normal process area correction values") in correspondence to each of these row regions. Moreover, the host-side controller 210 executing the printer driver 216 applies one group of correction values repeatedly during the color conversion process. In the front end process area and the rear end process area, the combination of row regions and nozzles Nz is not periodic. Accordingly, in the front end process area and the rear end process area, a correction value is set for each of the plurality of row regions.

Now, for the normal process area, correction values are set for one period, and for the front end process area and the rear end process area, a correction value is set for each row region. Thus, due to the fact that the characteristics of the correction values differ, if the correction values for the front end region or the correction values for the rear end region and the correction values for the normal process area are used as they are, it may occur that the extent of the density correction differs between the area corrected by the correction values for the front end process area or the correction values for the rear end process area and the area corrected by the correction values for the normal process area, and a density difference may occur at the border area.

Here, with this printing system 10, front end process area correction values and rear end process area correction values (equivalent to first correction values) that correspond to the front end process and the rear end process (equivalent to a first printing method that is applied to an end area in the transport direction of the medium) and are for correcting the ink ejection amount for each row region individually, as well as correction values for the normal process area (equivalent to second correction values) that correspond to the normal process (equivalent to a second printing method that is applied to an intermediate area in the transport direction of the medium) and are for correcting the ink ejection amount for each row region individually are set row region by row region. Then, while printing on the paper S, the host computer 200 corrects the ink ejection amount for each row region individually, using a compound correction value, which is obtained by combining the front end process area correction values or the rear end process area correction values and the normal process area correction values, for the coexistent segments in which row regions formed by raster lines (corresponding to dot rows) in the front end process or the rear end process are coexistent with other row regions formed by raster lines in the normal process.

By adopting such a configuration, correction of the ink ejection amount is achieved by the combined correction values in the coexistent segments, and the difference between the extents of correction due to the correction values is eased. As a result, a deterioration of the image quality caused by differences in correction values can be prevented. As a result, the image quality can be improved. This is described in greater detail further below.

Correction Value Setting System 20

To explain the setting of the correction values, the correction value setting system 20 used for setting the correction values is explained first. As shown in FIG. 11, the correction value setting system 20 includes a scanner 300 and a process host computer 200'.

Scanner 300

The scanner 300 includes a scanner-side controller 310, a reading mechanism 320, and a movement mechanism 330. The scanner-side controller 310 includes a CPU 311, a memory 312, and an interface section 313. The CPU 311 performs the overall control of the scanner 300. The CPU 311 is communicatively connected to the reading mechanism 320 and the movement mechanism 330. The memory 312 is for ensuring a working region and a region for storing computer programs, and is constituted by a RAM, EEPROM, ROM or the like. The interface section 313 interfaces with the process host computer 200' and exchanges data with it. In this embodiment, the interface section 313 of the scanner 300 is connected to the second interface section 214 of the process host computer 200'.

Figure 12A:
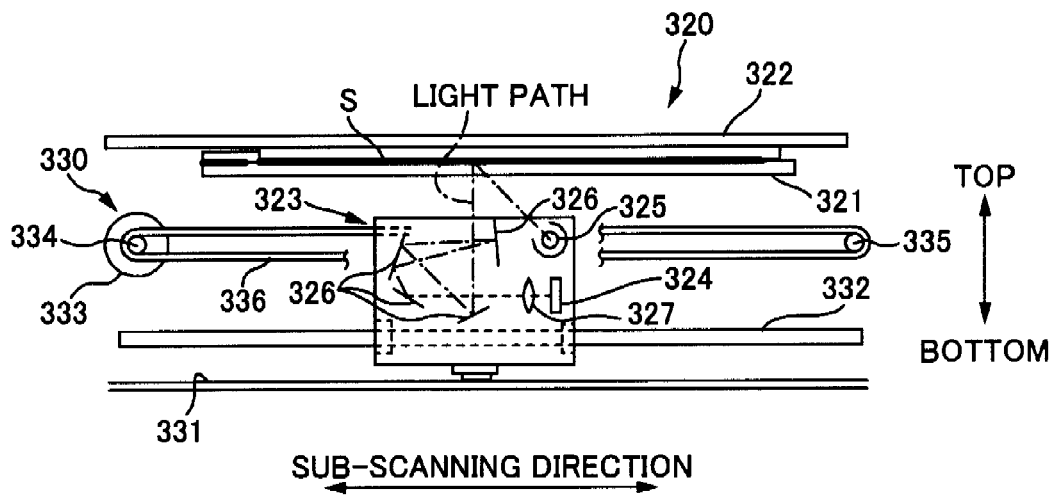
FIG. 12A is a front view illustrating the configuration of a scanner.
Figure 12B:
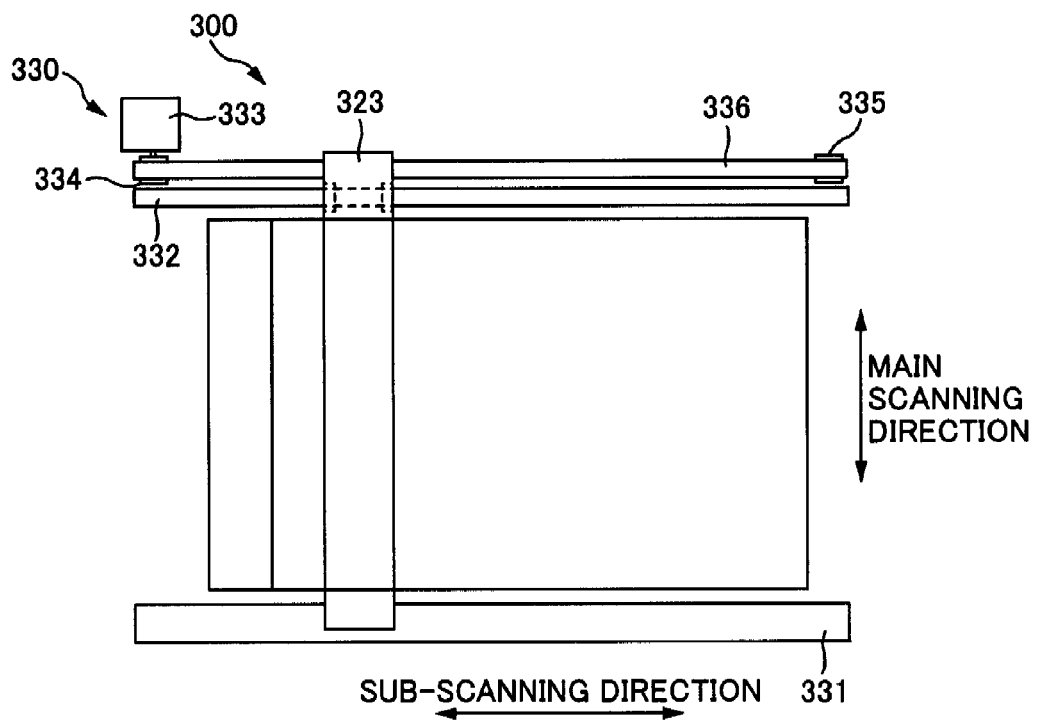
FIG. 12B is a top view illustrating the configuration of the scanner.

As shown in FIGS. 12A and 12B, the reading mechanism 320 includes a platen glass 321, a platen cover 322, and a reading carriage 323. The reading carriage 323 faces the side to be read of the original (the paper S on which a test pattern CP is printed) via the platen glass 321, and moves in a predetermined direction along the platen glass 321. This reading carriage 323 measures the density of the image with CCD image sensors 324. A plurality of these CCD image sensors 324 are provided in correspondence to the reading width along the direction intersecting (the perpendicular direction in this embodiment) the movement direction of the reading carriage 323. Moreover, light from an exposure lamp 325 is reflected by the document, and this reflection light is guided by a plurality of mirrors 326. Then it is condensed with a lens 327 and input into CCD devices. Thus, density data indicating the density of the image is obtained. That is to say, the density of the image is measured.

The movement mechanism 330 is for moving the reading carriage 323. This movement mechanism 330 includes a support rail 331, a regulating rail 332, a drive motor 333, a drive pulley 334, an idler pulley 335, and a timing belt 336. The support rail 331 supports the reading carriage 323 in a movable state. The regulating rail 332 regulates the movement direction of the reading carriage 323. The drive pulley 334 is attached to the rotation shaft of the drive motor 333. The idler pulley 335 is arranged at the end opposite to the drive pulley 334. The timing belt 336 is suspended by the drive pulley 334 and the idler pulley 335 and a portion of it is fixed to the reading carriage 323.

With the scanner 300 having such a configuration, the reading carriage 323 is moved along the platen glass 321 (that is, the reading face of the original), and the voltage output from the CCD image sensors 324 is obtained at a predetermined period. Thus, it is possible to measure the density of an original over the distance that the reading carriage 323 is moved during one period.

Process Host Computer 200'

The process host computer 200' has the same configuration as the host computer 200 of the printing system 10. Accordingly, like components are assigned the same reference numerals and are not further explained. A big difference between the host computer 200' and the host computer 200 lies in the computer programs installed on them. That is to say, a process program is installed as an application program on the process host computer 200'. This process program provides the process host computer 200' for example with a function for printing a test pattern CP on the printer 100 for which correction values are to be set, a function for obtaining measurement values of the density in the test pattern CP under the control of the scanner 300, and a function for setting the correction values for each row region from the density measurement values.

Also a printer driver for controlling the printer 100 and a scanner driver for controlling the scanner 300 are installed on the process host computer 200'. As shown in FIG. 13, a partial region of the memory 212 of the process host computer 200' is used as a data table for storing density data (measurement values). Furthermore, the process host computer 200' stores the obtained correction values in a correction value storage region 155 of the target printer 100.

Then, as shown in FIG. 14, the correction value storage region 155 includes a region storing front end process area correction values, a region storing normal process area correction values, a region storing rear end process area correction values, a region storing front end-side combined correction values, and a region storing rear end-side combined correction values. Moreover, besides the correction value storage region 155, the memory 152 of the printer 100 includes a region storing a row region number of the front end process area (front end process segment, front end-side coexistent segment), a region storing a row region number of a normal process area, and a region storing a row region number of the rear end process area (rear end process segment, rear end-side coexistent segment).

Process at the Printer Manufacturing Plant

Printing of the Test Pattern CP

Next, the process that is carried out at the printer manufacturing plant is explained. It should be noted that the correction value setting process explained in the following is realized by the computer programs that are installed on the process host computer 200', namely the correction value setting program, the scanner driver, and the printer driver. Consequently, these computer programs include code for performing a correction value setting process.

Prior to the correction value setting process, an operator at the plant connects the printer 100 for which the correction values are to be set to the process host computer 200'. The correction value setting program that is installed on the process host computer 200' lets a CPU 212 carry out a process for setting the correction values as well as related processes. These processes include for example a process for letting the printer 100 print the test pattern CP, a process of subjecting the density data obtained from the scanner 300 to image processing and analysis or the like, and a process for storing the set correction values in the correction value storage region 155 of the printer 100.

Figures 15A, 15B:
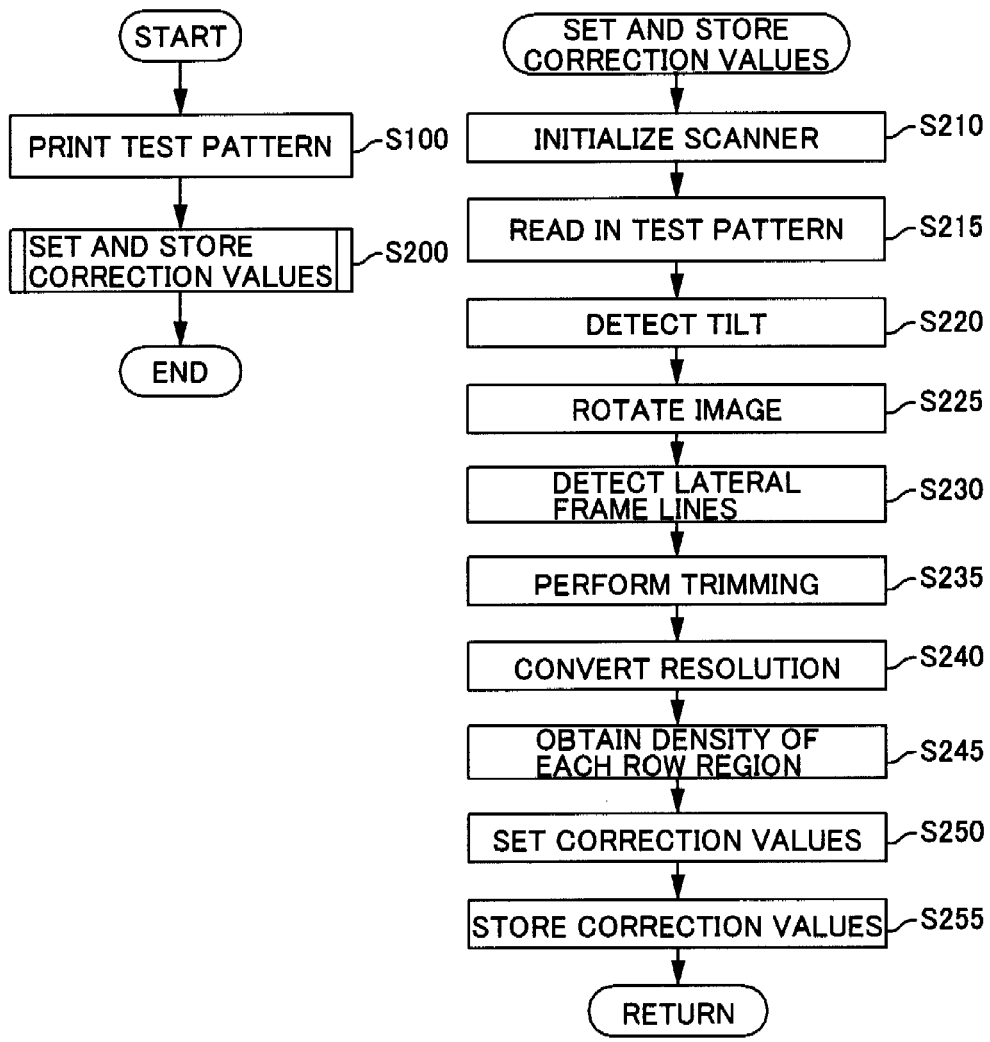
FIG. 15A is a flowchart illustrating a correction value setting process that is carried out during an inspection after manufacturing the printer.
FIG. 15B is a flowchart illustrating a step of setting and storing a correction value in a correction value setting process.

After the printer 100 has been connected, the test pattern CP is printed (S100), as shown in FIG. 15A. This printing step is carried out upon an instruction by the operator. In this printing step, the CPU 212 of the process host computer 200' generates the print data for the test pattern CP. The print data generated by the CPU 212 is sent to the printer 100. Then, based on the print data from the process host computer 200', the printer 100 prints the test pattern CP on the paper S. The printing operation is carried out in accordance with the above-described process (see FIG. 7). Simply speaking, it is carried out by repeating a dot formation operation (S030) and a transport operation (S040) in accordance with the print data. That is to say, in the dot formation operation, ink is ejected toward the paper S while moving the head 131 in the carriage movement direction. Then, in the transport operation, the paper S is transported in the transport direction. At this stage, correction values are not stored in the correction value storage region 155. Therefore, the printed test pattern CP reflects the ejection characteristics of each of the nozzles Nz.

Test Pattern CP

Figure 16:
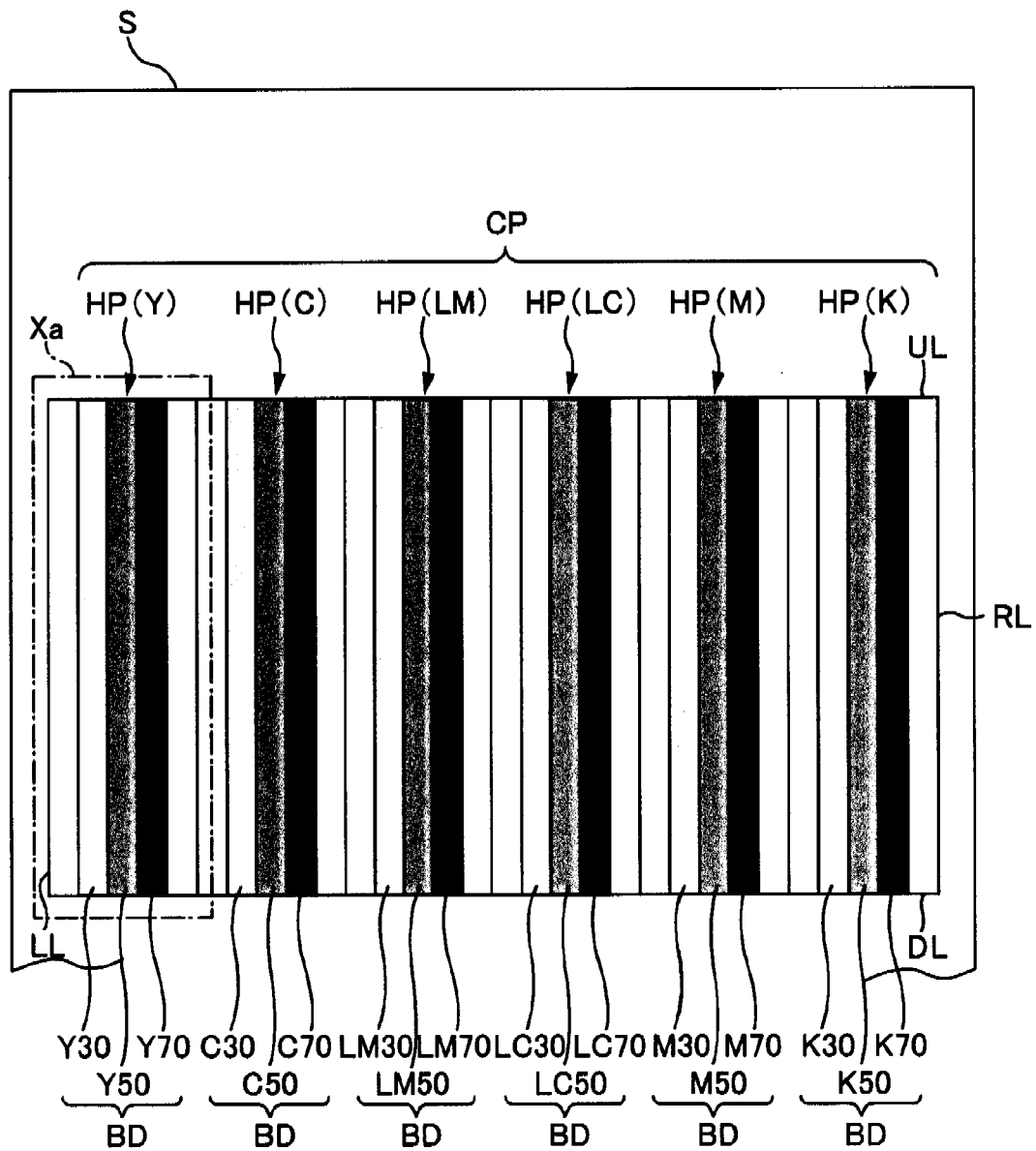
FIG. 16 is an explanatory diagram of a test pattern.

Next, the printed test pattern CP is explained. It should be noted that the test pattern CP is constituted by a plurality of correction patterns HP. One correction pattern HP is a portion that is rendered by a nozzle row that can eject the same type of ink (nozzle group), and corresponds to a sub-pattern. This correction pattern HP is used to assess density variations. As mentioned above, the head 131 of this printer 100 includes six nozzle rows, namely a black ink nozzle row Nk, a yellow ink nozzle row Ny, a cyan ink nozzle row Nc, a magenta ink nozzle row Nm, a light cyan ink nozzle row Nlc, and a light magenta ink nozzle row Nlm. Consequently, as shown in FIG. 16, the test pattern CP includes six correction patterns HP (Y) to HP (K) corresponding to the respective nozzle rows. Moreover, these correction patterns HP(Y) to HP(K) are placed (printed) lined up in the carriage movement direction.

Figure 17:
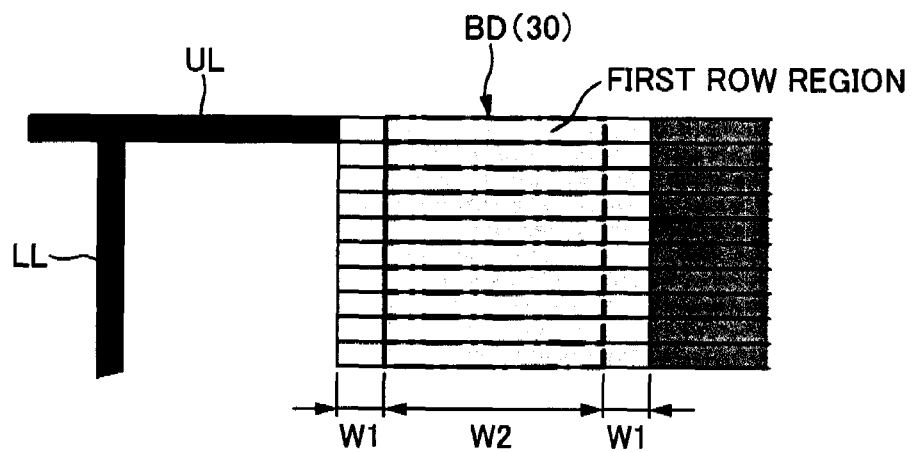
FIG. 17 is an explanatory diagram showing a portion of a correction pattern.

As shown in FIGS. 16 and 17, the correction patterns HP (Y) to HP(K) are each constituted by a plurality of types of stripe-shaped patterns BD, an upper frame line UL, a lower frame line DL, a left frame line LL, and a right frame line RL. The stripe-shaped patterns BD correspond to regions that are printed at varying densities and are made of stripes extending in the transport direction. The stripe-shaped patterns BD of the present embodiment are constituted by three types of patterns that are each printed with a different density instruction value. Consequently, the test pattern CP can be said to include a plurality (corresponding to the number of nozzle rows) of sets of stripe-shaped patterns BD that are each printed with a different density instruction value (sets of regions).

For example, the correction pattern (Y) printed with the yellow ink nozzle row Ny includes a stripe-shaped pattern BD(Y30) printed with a density of 30%, a stripe-shaped pattern BD(Y50) printed with a density of 50%, and a stripe-shaped pattern BD(Y70) printed with a density of 70%. For convenience's sake, where the following explanations refer to a correction pattern HP without specifying the nozzle row, they refer simply to a correction pattern HP. Similarly, where the stripe-shaped patterns BD are explained without specifying the nozzle row, they are indicated as stripe-shaped pattern BD(30) for the 30% density pattern, stripe-shaped pattern BD(50) for the 50% density pattern, and stripe-shaped pattern BD(70) for the 70% density pattern.

These stripe-shaped patterns BD(30) to BD(70) are stripe-shaped regions extending in the transport direction and are lined up one next to the other in the carriage movement direction. It should be noted that in the present embodiment, ink of the same color (also referred to as process ink in the following) is ejected from the respective nozzle rows during the process. The color of this process ink is for example light magenta. The correction patterns HP(Y) to HP(K) printed on the paper S exhibit density irregularities due to the characteristics of the nozzles Nz constituting the nozzle rows, even when the same color is printed. By setting the correction value such that these density irregularities are reduced, it is possible to reduce the density irregularities when the user prints with multiple colors.

Figure 19:
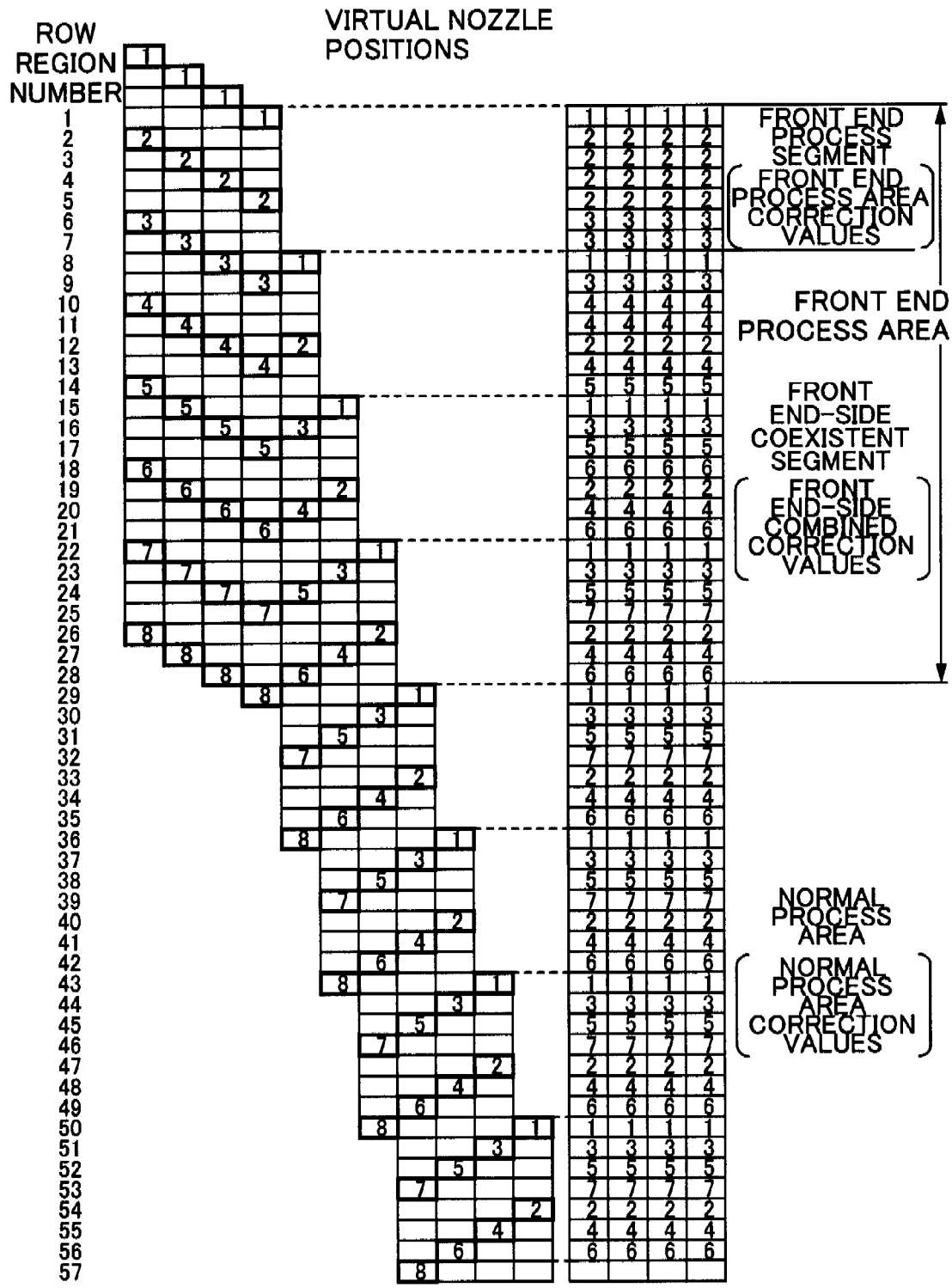
FIG. 19 is a diagram illustrating the relationship of the front end process area and the normal process area with the correction values for each row region individually.
Figure 20:
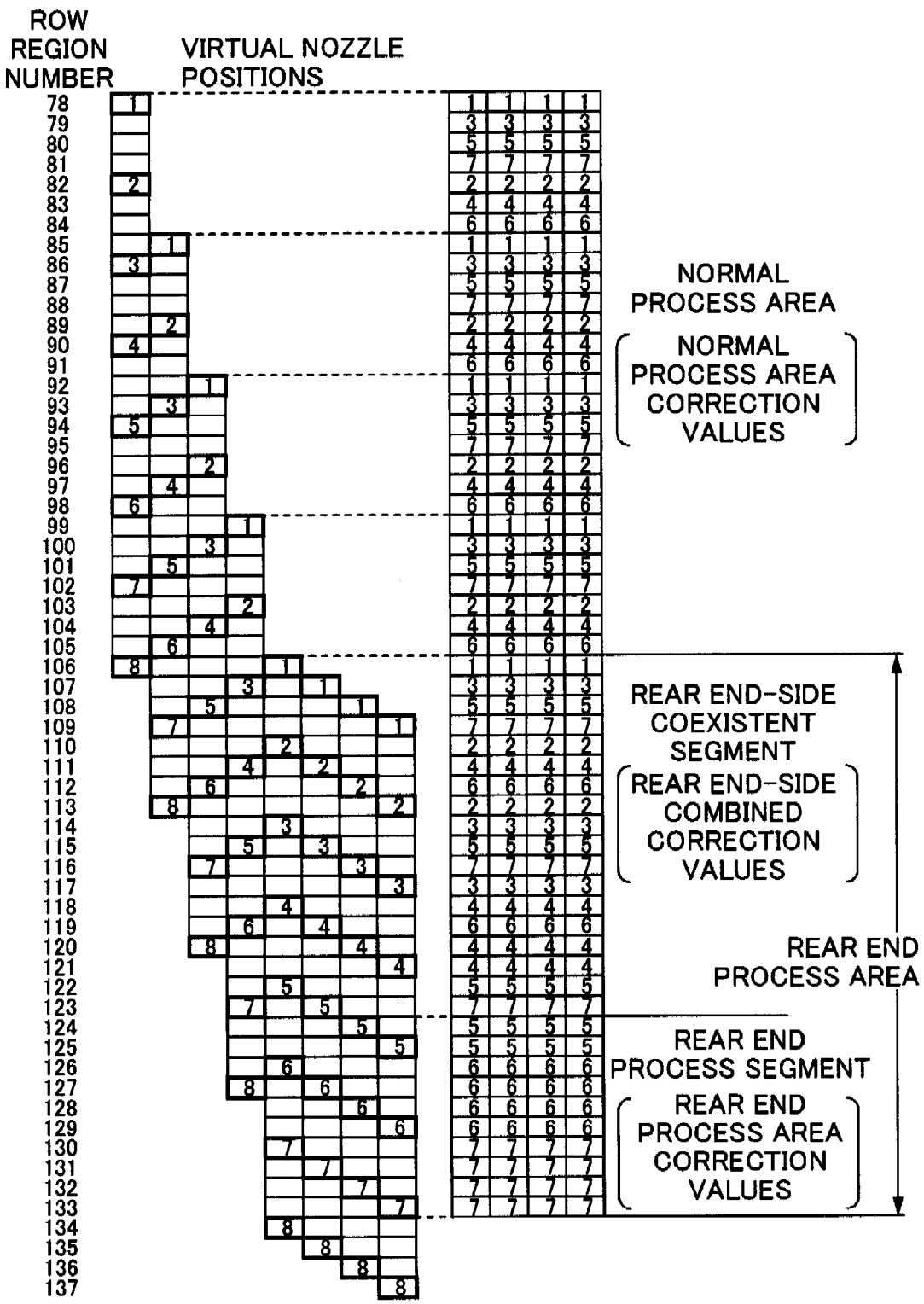
FIG. 20 is a diagram illustrating the relationship of the normal process area and the rear end process area with the correction values for each row region individually.

As mentioned above, while printing an image, a front end process, a normal process and a rear end process are carried out. Moreover, also the correction patterns HP are printed by the same procedure as when printing an image, that is, by a front end process, a normal process and a rear end process. Consequently, the correction pattern HP includes a front end process area in which the pattern is formed by the front end process, a normal process area in which the pattern is formed by the front end process, and a rear end process area in which the pattern is formed by the rear end process. As shown in FIG. 19, the front end process area includes a front end process segment constituted by row regions in which raster lines are formed by the front end process, and a front end-side coexistent segment in which row regions of raster lines formed by the front end process are coexistent with row regions of raster lines formed by the normal process. Similarly, as shown in FIG. 20, the rear end process area includes a rear end process segment constituted by row regions in which raster lines are formed by the rear end process, and a rear end-side coexistent segment in which row regions of raster lines formed by the rear end process are coexistent with row regions of raster lines formed by the normal process.

It should be noted that in image printing performed by the user, the number of row regions constituting the normal process area is about several thousand in the case of for example an A4-sized sheet. However, since the combination of nozzles Nz responsible for the various row regions of the normal process area is periodic, it is not necessary to print them all. Accordingly, in the present embodiment, the length, with respect to the transport direction, of the normal process area of the correction pattern HP is such that row regions for a plurality of periods are included. For example, the length may be such that eight periods are included.

Moreover, as shown in FIG. 17, the upper frame line UL of the correction pattern HP is formed by the first row region in the stripe-shaped pattern BD. Similarly, the lower frame line DL is formed by the last row region in the stripe-shaped pattern BD.

Initialization of the Scanner 300

When the test pattern CP has been printed, a process of setting the correction values and storing them in the printer 100 is performed (S200). This process is described in the following. As shown in FIG. 15B, in this process, first, the initialization of the scanner 300 is performed (S210). In this initialization, essential items, such as the reading resolution of the scanner 300 or the type of document, are set. Here, it is desirable that the reading resolution of the scanner 300 is higher than the printing resolution. Preferably, it is set to an integer multiple of the printing resolution. In this example, the printing resolution of the test pattern CP is 720 dpi, so that the reading resolution of the scanner 300 is four times that, namely 2880 dpi. The document type is "reflective document", the image type is "8-bit grayscale", and the storage format is "bitmap."

Reading of the Test Pattern CP

When the initialization of the scanner 300 has been performed, the test pattern CP is read in (S215). In this step, the scanner-side controller 310 of the scanner 300 controls the reading mechanism 320 and the movement mechanism 330, and the density data of the entire paper sheet S is obtained. Here, the density data is obtained along the longitudinal direction of the stripe-shaped patterns BD. Then, the scanner 300 outputs the obtained density data to the process host computer 200'. It should be noted that the density data obtained like this is data expressing the density of each pixel (here, regions of a size that is prescribed by the reading resolution), constituting an image. Therefore, in the following explanations, the data obtained with the scanner 300 is also referred to as "image data." Moreover, the density data of the pixels constituting the image data is referred to as "pixel density data." This pixel density data is configured by tone values indicating density.

When the image data is received from the scanner 300, the host-side controller 210 of the process host computer 200' cuts out the image data of a predetermined region corresponding to the correction pattern HP from the received image data. This predetermined region is set to a rectangular region that is slightly larger than the correction patterns HP. In this embodiment, six sets of image data are cut out in correspondence with each of the six correction patterns HP. For example, the image data of the region marked by sign Xa in FIG. 16 is cut out for the correction pattern HP(Y) that is rendered by the nozzle row ejecting yellow ink.

Tilt Angle Correction for each Correction Pattern HP

Next, the host-side controller 210 detects the tilt angle θ of the correction pattern HP included in the image data (S220) and subjects the image data to a rotation process corresponding to this tilt angle θ (S225). For example, the host-side controller 210 obtains the image density of the upper frame line UL at different positions in the width direction of the paper S, and detects the tilt angle θ of the correction pattern HP based on these image densities. Then, it carries out a rotation process of the image data based on the detected tilt angle.

Trimming of the Correction Pattern HP

Next, the host-side controller 210 detects the lateral frame lines (upper frame line UL, lower frame line DL) from the image data of the individual correction patterns HP (S230) and performs trimming (S235). First, the host-side controller 210 obtains the image density data for the pixels of a predetermined region from the image data after the rotation process. Then, the upper frame line UL is identified based on the image density, and the portion above this upper frame line UL is removed by trimming. Similarly, the lower frame line DL is identified based on the image density, and the portion below this lower frame line DL is removed by trimming.

Resolution Conversion

When the trimming has been performed, the host-side controller 210 converts the resolution of the trimmed image data (S240). In this process, the resolution of the image data is converted such that the pixel number in the Y-axis direction (the transport direction, a direction in which the row regions are arranged) of the image data becomes the same as the number of raster lines constituting the correction pattern HP. Let us assume that a correction pattern HP printed with a resolution of 720 dpi is read in with a resolution of 2880 dpi. In this case, ideally the number of pixels in the Y-axis direction of the image data becomes four times the number of raster lines constituting the correction pattern HP. However, due to the influence of errors during the printing and during the reading, the number of raster lines may not match the number of pixels in practice. The resolution conversion is performed on the image data in order to cancel such inconsistencies. In this resolution conversion process, a conversion ratio is calculated based on the ratio between the number of raster lines constituting the correction pattern HP and the number of pixels in the Y-axis direction of the trimmed image data. Then, the resolution conversion process is performed with the calculated ratio. It is possible to use a number of methods, such as bicubic interpolation, for this resolution conversion. As a result, the number of pixels lined up in the Y-axis direction becomes the same as the number of row regions, and there is a one-to-one correspondence between the rows of pixels lined up in the X-axis direction and the row regions.

Obtaining the Density of Each Row Region

Figure 18:
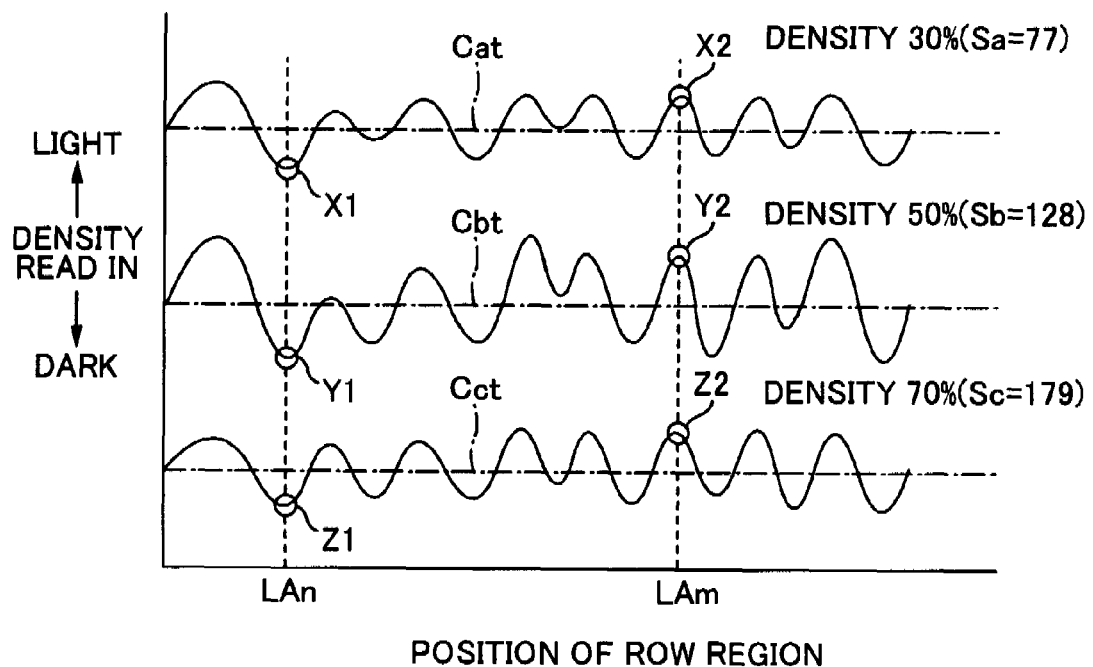
FIG. 18 is a diagram showing the measurement values of the stripe-shaped patterns for each row region individually.

Next, the host-side controller 210 obtains the density of each of the row regions in the correction pattern HP (S245). To obtain the density of each of the row regions, the host-side controller 210 obtains the centroid position of the vertical frame line serving as a reference (in this example, the left frame line LL), and specifies the pixels constituting the stripe-shaped pattern BD taking this centroid position of the frame line as a reference. Then, the pixel density data for the specified pixels are obtained. For example, for the stripe-shaped pattern BD(30) printed with a density of 30%, the pixel density data is obtained for the pixels belonging to the center region W2 excluding the portions denoted W1 on both sides, as shown in FIG. 17. Then, the average value obtained from the obtained pixel density data is taken as the measurement value at 30% density for the first row region. Also for the second row region and the rest of the stripe-shaped pattern BD, measurement values are obtained in the same manner. These measurement values correspond to the density measurement values taken with the scanner 300. Then, the obtained measurement values are stored in a data table (see FIG. 13) of the memory 212 of the host-side controller 210. That is to say, the measurement values are stored in a region that is specified by type of nozzle row, the print density of the pattern and the number of the row region. It should be noted that density 1 to density 3 in FIG. 13 mean the densities of the stripe-shaped patterns BD. For example, density 1 corresponds to 30% density, density 2 corresponds to 50% density, and density 3 corresponds to 70% density. When the measurement vales stored in the data table are plotted on the vertical axis over the position of the row regions on the horizontal axis, a graph as show for example in FIG. 18 is obtained.

Setting of Correction Values

When a measurement value has been obtained for each row region, the host-side controller 210 sets the correction value for each row region (S250). As noted above, one stripe-shaped pattern BD is printed with the same instruction tone value. However, there are variations among the obtained measurement values (density measurement values) of the various row regions. These variations are a cause for density irregularities in the printed image. In order to eliminate these density irregularities, it is desired for each of the stripe-shaped patterns BD that the measurement values for the individual row regions match each other as close as possible. With regard to this aspect, a correction value is set for each row region, based on the measurement value of each row region. As noted before, the test pattern CP includes a plurality of correction patterns HP(Y) to HP(K) printed for each of the types of nozzle rows, and each of the correction patterns HP (Y) to HP (K) includes stripe-shaped patterns BD that are printed with different predetermined densities. Moreover, the stripe-shaped patterns BD(30) to BD(70) each include a plurality of row regions. That is to say, within the stripe-shaped patterns BD (the regions printed at predetermined densities) a plurality of row regions are lined up in the transport direction. Consequently, the correction values are set for each of the different colors, for each of the different densities and for each row region.

As shown in FIGS. 19 and 20, in the printer 100, the ink ejection amount for the row regions belonging to the normal process area is corrected based on the normal process area correction values. The ink ejection amount for the row regions belonging to the front end process segment of the front end process area is corrected based on the front end process area correction values. And the ink ejection amount for the row regions belonging to the front end-side coexistent segment of the front end process area is corrected based on the front end-side combined correction values obtained by a combination of the front end process area correction values and the normal process area correction values. Similarly, the ink ejection amount for the row regions belonging to the rear end process segment of the front end process area is corrected based on the rear end process area correction values, and the ink ejection amount for the row regions belonging to the rear end-side coexistent segment of the rear end process area is corrected based on the rear end-side combined correction values obtained by a combination of the rear end process area correction values and the normal process area correction values. Consequently, the correction value setting system 20 sets front end process area correction values, normal process area correction values, rear end process area correction values, front end-side combined correction values and rear end-side combined correction values and stores them in the printer 100. The following is an explanation of the setting of these correction values.

Setting of the Front End Process Area Correction Values

First, the setting of the front end process area correction values is explained. As noted above, the front end process area correction values are correction values that are applied to the row regions constituting the front end process area. As shown in FIG. 19, the front end process area includes a front end process segment and a front end-side coexistent segment. Here, the front end process segment is constituted by a plurality of row regions in which raster lines are formed by the front end process. Therefore, they correspond to the front end area in the transport direction on the medium. In the example of FIG. 19, the row regions of #1 to #7 belong to the front end process segment. Moreover, the front end process area correction values that are applied to the row regions of the front end process segment correspond to a first correction value (first correction value on the front end side). It should be noted that the front end process area correction values are set individually for each of the plurality of row regions constituting the front end process area. In this example, they are set for the row regions #1 to #28.

The following is an explanation of how the correction values for the instructed tone values Sb (50% density) for given row regions LAn, LAm are set. First, the host-side controller 210 sets a target density for the density for which the correction value is to be set. In this example, the average value of the measurement value of the row regions (the density read in) is set as a target density for the stripe-shaped pattern BD of the density for which the settings are made. In the example of FIG. 18, the density marked Cbt is set as the target density. Then, the correction value for a given row region is determined in accordance with the difference to the measurement value. By setting the correction value for each row region in this manner, more appropriate values are determined for the individual correction values. This is because the image densities of all of the row regions are equalized to the average density as the target density. This aspect is also the same for the other densities. That is to say, for 30% density, the density marked by symbol Cat is set as the target density, and for 70% density, the density marked by symbol Cct is set as the target density.

Next, the host-side controller 210 selects a measurement value of a lower density that is lower than the density for which the correction value is to be set and a measurement value of a higher density that is higher than the density for which the correction value is to be set. In the present embodiment, the density for which the correction value is to be set is 50% density (instructed tone value Sb), so that the measurement value of the row region constituting the stripe-shaped pattern BD for 30% density is selected as the lower density. Similarly, the measurement value of the row region constituting the stripe-shaped pattern BD for 70% density is selected as the higher density. It should be noted that the row regions selected for the lower density and the higher density are located at the same position as the row region that is being set. For example, if the correction value is set for the row region LAn, the measurement value of the row region LAn for 30% density and the measurement value of the row region LAn for 70% density are selected.

When the measurement values for the lower density and the higher density have been selected, the host-side controller 210 specifies a pair of measurement values to be referenced, in accordance with whether the measurement value corresponding to the row region of 50% density for which the correction value is to be set is larger or smaller than the target density Cbt. Here, the pair of measurement values is specified such that the target density falls into the range given by the measurement value of the row region for which the setting is made and the measurement value of another density. That is to say, if the measurement value of the row region for which the setting is made is higher than the target density, then the pair of the measurement value of the row region for which the setting is made and the measurement value of the lower density is specified as the pair of measurement values to be referenced. Conversely, if the measurement value of the row region for which the setting is made is lower than the target density, then the pair of the measurement value of the row region for which the setting is made and the measurement value of the higher density is specified as the pair of measurement values to be referenced.

For example, in the row region LAn, the measurement result of the row region for 30% density is X1, the measurement result of the row region for 50% density is Y1, and the measurement result of the row region for 70% density is Z1. Here, the measurement result Y1 of 50% density is plotted on the lower side of the target density Cbt in the graph. Moreover, the higher side on the vertical axis of this graph corresponds to lower densities and the lower side corresponds to higher densities.

Consequently, the measurement result Y1 of the row region LAn at 50% density is higher than the target density Cbt.

Therefore, the host-side controller 210 specifies the measurement value corresponding to the row region at 50% density and the measurement value corresponding to the row region at 30% as the pair of measurement values to be referenced. Moreover, in the row region LAm, the measurement result of the row region for 30% density is X2, the measurement result of the row region for 50% density is Y2, and the measurement result of the row region for 70% density is Z2. In this case, the density of the row region LAm at 50% density is lower than the target density Cbt. Therefore, the host-side controller 210 specifies the measurement value corresponding to the row region of 50% density and the measurement value corresponding to the row region of 70% as the pair of measurement values to be referenced.

When the pair of measurement values to be reference has been specified, the host-side controller 210 sets the correction value of the row region that is being processed. The setting of the correction value is carried out by linear interpolation based on the measurement values and the instructed tone value. The host-side controller 210 carries out the calculation of the linear interpolation for each of the row regions for which the correction value is to be set. Then, the correction values for the instructed tone value Sb (50% density) are set respectively.

The correction values are also set by the same procedure for the row regions of the other densities, that is, the row regions for 30% density (instructed tone value Sa) and 70% density (instructed tone value Sc). It should be noted that for 30% density and 70% density, the point where the referenced densities are fixed is different to the case of 50% density. That is to say, in the case of 30% density, the measurement value of the row region of 30% density and the measurement value of the row region of 50% density are referenced. And in the case of 70% density, the measurement value of the row region of 70% density and the measurement value of the row region of 50% density are referenced. With regard to setting the correction values by linear interpolation based on the measurement values and the instructed tone values, this is the same as in the case of 50% density.

Moreover, the correction values in this embodiment are set within a range of value "1" to value "256". Here, the value "128" means "no correction". Moreover, the larger correction values increase beyond "128", the higher the density is made, and the lower correction values fall below "128", the smaller the density is made. This is also the same for the other correction values.

Setting of the Normal process Area Correction Values

Next, the setting of the normal process area correction values is explained. As noted above, the normal process area correction values are correction values that are applied to the row regions constituting the normal process area. The normal process area corresponds to the middle area in the transport direction on the medium. Accordingly, the normal process area correction values correspond to second correction values. A predetermined number of normal process area correction values is set, that number being based on the number of combinations between row regions and nozzles. To explain this with the example shown in FIG. 19, seven types of combinations of row regions and nozzles Nz are given in the normal process area. These seven combinations occur periodically. More specifically, in the first row region, a dot row is formed by ink that is ejected from the first nozzle Nz (#1), and in the second row region, a dot row is formed by ink that is ejected from the third nozzle Nz (#3). In the third row region, a dot row is formed by ink that is ejected from the fifth nozzle Nz (#5), and in the fourth row region, a dot row is formed by ink that is ejected from the seventh nozzle Nz (#7). Similarly, in the fifth row region, a dot row is formed by ink that is ejected from the second nozzle Nz (#2), in the sixth row region, a dot row is formed by ink that is ejected from the fourth nozzle Nz (#4), and in the seventh row region, a dot row is formed by ink that is ejected from the sixth nozzle Nz (#6). Consequently, in this example, it can be said that seven normal process area correction values should be set in accordance with these row regions.

Also in this case, the host-side controller 210 sets a target density for the density for which the correction value is to be set. That is to say, the average value of the measurement values of the various row regions is set as the target density. Next, the host-side controller 210 averages the measurement values of the various periods for the first row region to the seventh row region, and obtains average measurement values. As noted above, one stripe-shaped pattern BD includes the row regions of eight periods. Therefore, the host-side controller 210 obtains the measurement values of the first row region for the first to eighth period, and takes the average value as the measurement value of the first row region. Similarly, it obtains the measurement values of the second row region for each period, and takes the average value thereof as the measurement value of the second row region. To explain this with the example of FIG. 19, the row region #29, the row region #36, the row region #43, the row region #50 and so on are each selected as a first row region. Then, by averaging the measurement values of these row regions, the measurement value of the first row region is obtained. Similarly, the row region #30, the row region #37, the row region #44, the row region #51 and so on are each selected as a second row region. Then, by averaging the measurement values of these row regions, the measurement value of the second row region is obtained. A similar process is also performed for the other row regions, and the measurement value (average value) for each of these row regions is calculated.

Next, the host-side controller 210 selects a lower density measurement value that is lower than the density for which the correction value is to be set and a higher density measurement value that is higher than the density for which the correction value is to be set. If the density for which the correction value is to be set is 50% density, then the measurement value of the row region constituting the stripe-shaped pattern BD of 30% density is selected as the lower density, and the measurement value of the row region constituting the stripe-shaped pattern BD of 70% density is selected as the higher density. Here, the row regions selected for the lower density and the higher density are located at the same position as the row region that is being set. For example, if the correction value is set for the first row region, the measurement value of the first row region at 30% density and the measurement value of the first row region at 70% density are selected. It should be noted that if the density for which the correction value is to be set is 30% density, then 30% density is selected as the lower density and 50% density is selected as the higher density. And if the density for which the correction value is to be set is 70% density, then 50% density is selected as the lower density and 70% density is selected as the higher density.

When the measurement values of the lower density and the higher density have been selected, the host-side controller 210 specifies a pair of measurement values to be referenced, and sets the correction values of the row region being processed. These procedures are similar to those performed when the front end process area correction values are set. To explain this briefly, if a correction value for 50% density is set, the host-side controller 210 specifies a pair of measurement values to be referenced in accordance with whether the measurement value is larger or smaller than the target density and sets the correction value by linear interpolation using the specified pair. If the correction value at 30% density or the correction value at 50% density is set, the host-side controller 210 uses a pair of predetermined measurement values to set the correction values by linear interpolation.

Setting of the Rear end Process Area Correction Values

Next, the setting of the rear end process area correction values is explained. As noted above, the rear end process area correction values are correction values that are applied to the row regions constituting the rear end process area. As shown in FIG. 20, the rear end process area includes a rear end process segment and a rear end-side coexistent segment. Here, the rear end process segment is constituted by a plurality of row regions in which raster lines are formed by the rear end process. Therefore, they correspond to the rear end area in the transport direction on the medium. In the example of FIG. 20, the row regions of #124 to #133 belong to the rear end process segment. Moreover, the rear end process area correction values that are applied to the row regions of the rear end process segment correspond to a first correction value (first correction value on the rear end side). It should be noted that, like the front end process area correction values, also the rear end process area correction values are set individually for each of the plurality of row regions constituting the rear end process area. In this example, they are set for the row regions #106 to #133.

The rear end process area correction values are set with a similar procedure as the front end process area correction values. To explain this briefly, first the host-side controller 210 sets a target density for the density for which the correction value is to be set. Then it selects a lower density measurement value that is lower than the density for which the correction value is to be set and a higher density measurement value that is higher than the density for which the correction value is to be set. When the measurement values for the lower density and the higher density have been selected, the host-side controller 210 specifies a pair of measurement values to be referenced, in accordance with whether the measurement value corresponding to the row region of the density for which the correction value is to be set is larger or smaller than the target density. Then, the correction value of the row region being processed is set. For example, it is set by performing a linear interpolation based on the measurement values and the instructed tone value.

Setting of Front end-Side Combined Correction Values

Next, the setting of the front end-side combined correction values is explained. The front end-side combined correction values are applied to the front end-side coexistent segment in the front end process area. In the example of FIG. 19, the row regions #8 to #28 belong to the front end-side coexistent segment. In this front end-side coexistent segment, the row regions in which the raster lines are formed by the front end process are the row regions #9 to #11, #13, #14, #17, #18, #21 and #25. In the row regions of other numbers, the raster lines are formed by the normal process. Here, looking at the row regions in which the raster lines are formed by the front end process, it can be seen that the ratio of these row regions increases when approaching the front end process segment and decreases as the distance to the front end process segment increases. For example, in the row regions #8 to #16 that belong to the first half portion of the front end-side coexistent segment, in five of the nine row regions, the raster lines are formed by the front end process. On the other hand, in the row regions #20 to #28 that belong to the second half portion of the front end-side coexistent segment, only in two of the nine row regions, the raster lines are formed by the front end process. Accordingly, the front end-side coexistent segment can be said to be a segment that lies on the front end-side from the middle area in transport direction of the paper S (corresponding to the downstream side in transport direction), where the ratio of regions in which the raster lines are formed by the normal process increases when approaching the normal process area (corresponding to a middle area of the medium).

Figure 21:
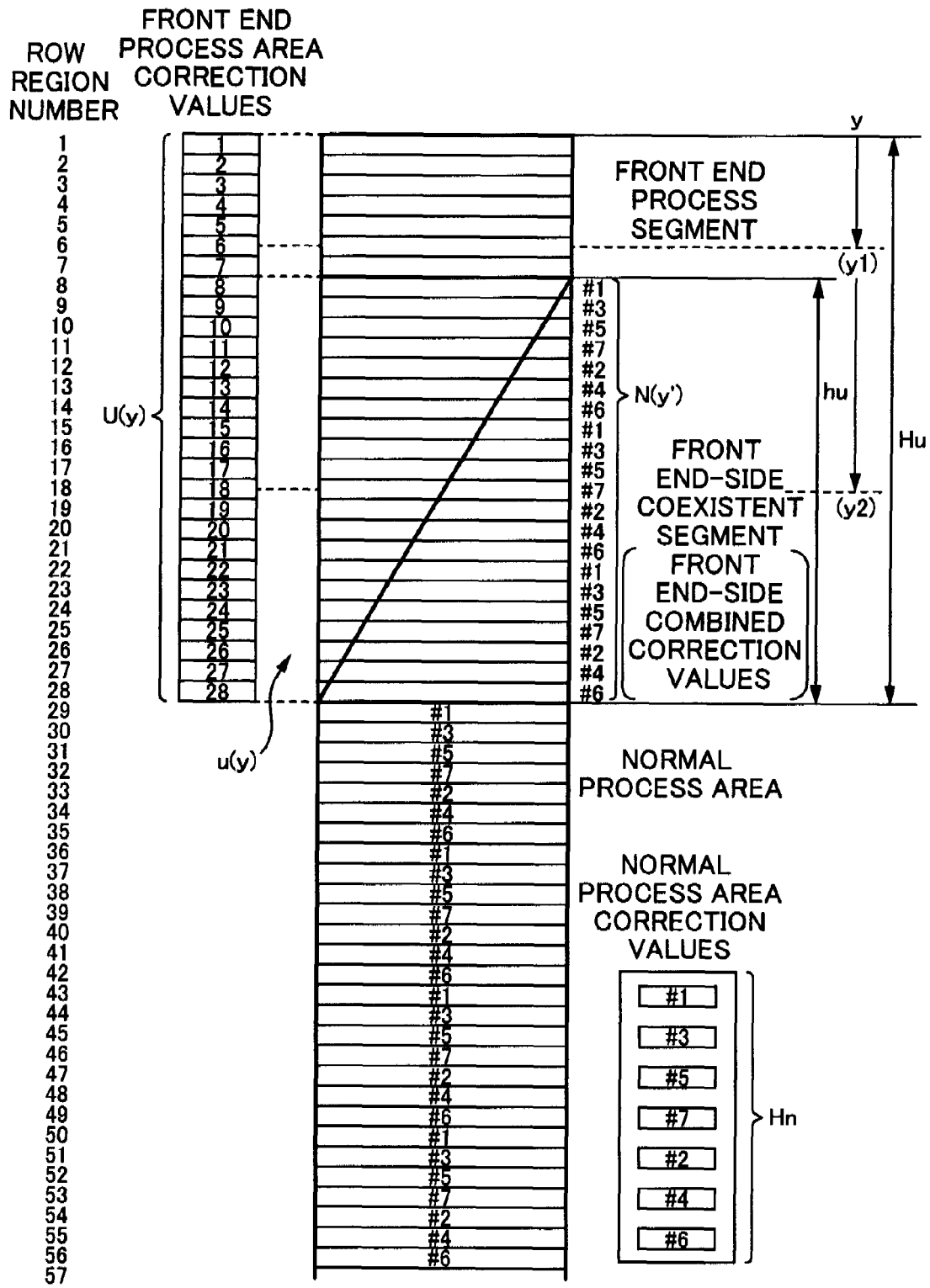
FIG. 21 is a diagram schematically illustrating the relationship between the front end process area correction values, the front end-side combined correction values and the normal process area correction values.

As for the front end-side combined correction values, the proportion at which the front end process area correction values and the normal process area correction values are combined is determined based on the position of the row region for which the correction value is to be set in the front end-side coexistent segment. For example, as shown in FIG. 21, comparing the combined correction values for the row regions positioned close to the normal process area with the combined correction values for the row regions positioned far from the normal process area, the proportion of the normal process area correction values of the former (the closer ones) is set to be greater than the proportion of the normal process area correction values of the latter (the farther ones). Moreover, the proportion of the normal process area correction values is larger the closer the row region is to the normal process area.

The reason for this is that in the front end-side coexistent segment, the proportion of row regions in which the raster lines are formed by the normal process increases the closer the row regions are to the normal process area. By setting the proportion for the combination in this manner, it is possible to match the proportion for the combination of the front end process area correction value and the normal process area correction value to the proportion of row regions in which the raster lines are formed by the front end process and row regions in which the raster lines are formed by the normal process. That is to say, it is possible to set the proportion of the combination of the two kinds of correction values to match the ratio of the two kinds of row regions. As a result, the front end-side combined correction values can be optimized and an optimization of the correction can be achieved. The following is a more specific explanation of a procedure for this.

Specific Setting Procedure

The front end-side combined correction values are set by the host-side controller 210 of the process host computer 200'. Therefore, the following parameters are passed to the host-side controller 210 during the setting. As shown in FIG. 21, the number Hu of row regions belonging to the front end process area, the number Hn of types of normal process area correction values, the number hu of row regions constituting the front end-side coexistent segment, and the number y of the row region for which the correction value is to be set are passed on as parameters for the calculation. When the number y of the row region is determined, the front end process area correction value U(y) and the normal process area correction value N (y') corresponding to that number y are specified. Then, when the number y of the row region for which the correction value is to be set is passed to the host-side controller 210, the host-side controller 210 calculates the following Equations (1) to (3) and determines the front end-side combined correction value u(y) corresponding to that row region. That is to say, it calculates the combination ratio for each row region, and determines the front end-side combined correction value u(y).

$$\text{If } y < Hu - hu: \quad u(y) = U(y) \quad (1)$$

$$\text{If } y \geq Hu - hu: \quad u(y) = \left[ \begin{array}{c} \dfrac{y - (Hu - hu)}{hu} \times (N(y') - 128) + \\ \dfrac{Hu - y}{hu} \times (U(y) - 128) \end{array} \right] + 128 \quad (2)$$

$$y' = ((y + Hn) - (Hu \bmod Hn) + 1) \bmod Hn) + 1 \quad (3)$$

As can be seen from Equation (1), when the row region with the number y belongs to the front end process segment, (that is, when y<Hu−hu), then the front end process area correction value U(y) corresponding to this row region is used as it is. It should be noted that according to Equation (1), the front end-side combined correction value u(y) is the same as the front end process area correction value U(y). This is because when the row region with the number y belongs to the front end process segment, the setting process is the same as when it belongs to the front end-side coexistent segment. As can be seen from Equation (2), when the row region with the number y belongs to the front end-side coexistent segment (that is, when y≧Hu−hu), then ratios between the number hu of the row regions in the front end process segment and the numbers Hu−y and y−(Hu−hu) of row regions occupying the front end process segment specified by the number y are used. Moreover, the front end process area correction value U(y) and the normal process area correction value N (y') are combined proportionally at the determined distribution. It should be noted that as mentioned above, a predetermined number of normal process area correction values is provided that corresponds to the combinations of row regions and nozzles Nz responsible for those row regions. Therefore, the number y cannot be used as it is. Accordingly, a number y' of the correction value corresponding to the number y is determined as shown in Equation (3). Then, the corresponding normal process area correction value N(y') is used for the calculation. It should be noted that in Equation (3) "mod" denotes the modulo operation. For example, Hu mod Hn means the remainder of Hu÷Hn.

Here, this calculation is explained in detail based on the specific example of FIG. 21. In this example, the number Hu of row regions belonging to the front end process area is "28", the number of types Hn of normal process area correction values is "7", the number hu of row regions constituting the front end-side coexistent segment is "21", and the number y of row regions for which the correction value is to be set is a variable going from "1" to "28". First, the calculation is explained for the case of a row region number y1 (with the value y1=6). In the case of this example, when the number hu of row regions constituting the front end-side coexistent segment is subtracted from the number Hu of row regions belonging to the front end process area, then "7" is obtained. Then, the row region number y1 is "6", so that the condition y<Hu−hu is satisfied. Consequently, the front end process area correction value corresponding to the row region number y1 (that is, the front end process area correction value U(6) set for the sixth row region) is used as the correction value for this row region. Next, the calculation is explained for the case of a row region number y2 (with the value y2=18). In the case of this example, the value of the row region number y2 is "18", so that the condition y≧Hu−hu is satisfied. The number y2' for specifying the normal process area correction value is (((18+7)−(0+1))mod 7)+1. This is (24 mod 7)+1=4. Therefore, the host-side controller 210 specifies the correction value for the nozzle Nz (#7), which is the normal process area correction value of the fourth row region, as the normal process area correction value N(y2'). Moreover, based on the number y2 (=18), the correction value corresponding to the eighteenth row region is specified as the correction number U(y2) for the front end process area. When the normal process area correction value N (y2') and the correction value U(y2) for the front end process area corresponding to the number y2 have been specified, the host-side controller 210 determines the corresponding front end-side combined correction value u(y2). In this case, the host-side controller 210 carries out the calculation (18−(28−21))/21, and determines the coefficient that is used for the normal process area correction value. This coefficient is "11/21". Similarly, the host-side controller 210 carries out the calculation (28−18)/21, and determines the coefficient that is used for the front end process area correction value. This coefficient is "10/21". Furthermore, the host-side controller 210 subtracts the value "128", which means "no correction" from the normal process area correction value N(y2'), and multiplies the difference with the coefficient "11/21". Similarly, the value "128", which means "no correction", is subtracted from the front end process area correction value U(y2), and the difference is multiplied with the coefficient "11/21". After this, the values obtained through multiplication with the coefficients are added up, and by adding the value "128", which means "no correction", the front end-side combined correction value u(y2) is obtained. In this example, the coefficient used for the normal process area correction value is "11/21", and the coefficient used for the front end process area correction value is "10/21", so that the ratio of the normal process area correction value N(y2') to the front end process area correction value U(y2) in the front end-side combined correction value u(y2) is about one to one.

It should be noted that the ratio of the normal process area correction value N(y') to the front end process area correction value U(y) in the front end-side combined correction value u(y) changes in accordance with the row region number y. Generally speaking, as shown diagrammatically in FIG. 21, the closer the row region number y comes to indicating a row region near the normal process area, the more the ratio of the normal process area correction value N(y') becomes larger than that of the front end process area correction value U(y), and the more the row region number y comes to indicate a row region that is far away from the normal process area, the more the ratio of the normal process area correction value N(y') becomes smaller than that of the front end process area correction value U(y).

Setting of Rear End-Side Combined Correction Values

Next, the setting of the rear end-side combined correction values is explained. The rear end-side combined correction values are applied to the rear end-side coexistent segment in the rear end process area. In the example of FIG. 20, the row regions #106 to #123 belong to the rear end-side coexistent segment. In this rear end-side coexistent segment, the row regions in which the raster lines are formed by the rear end process are the row regions #106, #110, #113, #114, #117, #118, and #120 to #122. In the other row regions, the raster lines are formed by the normal process. Here, looking at the row regions in which the raster lines are formed by the rear end process, it can be seen that the ratio of these row regions increases when approaching the rear end process segment and decreases as the distance to the rear end process segment increases. Conversely, with regard to the row regions in which the raster lines are formed by the normal process, the ratio of these row regions increases when approaching the normal process area and decreases as the distance to the normal process area increases. Accordingly, the rear end-side coexistent segment can be said to be a segment that lies on the rear end-side from the middle area in transport direction of the paper S (corresponding to the upstream side in the transport direction), where the ratio of regions in which the raster lines are formed by the normal process decreases with increase of the distance from the normal process area (corresponding to a middle area of the medium).

Figure 22:
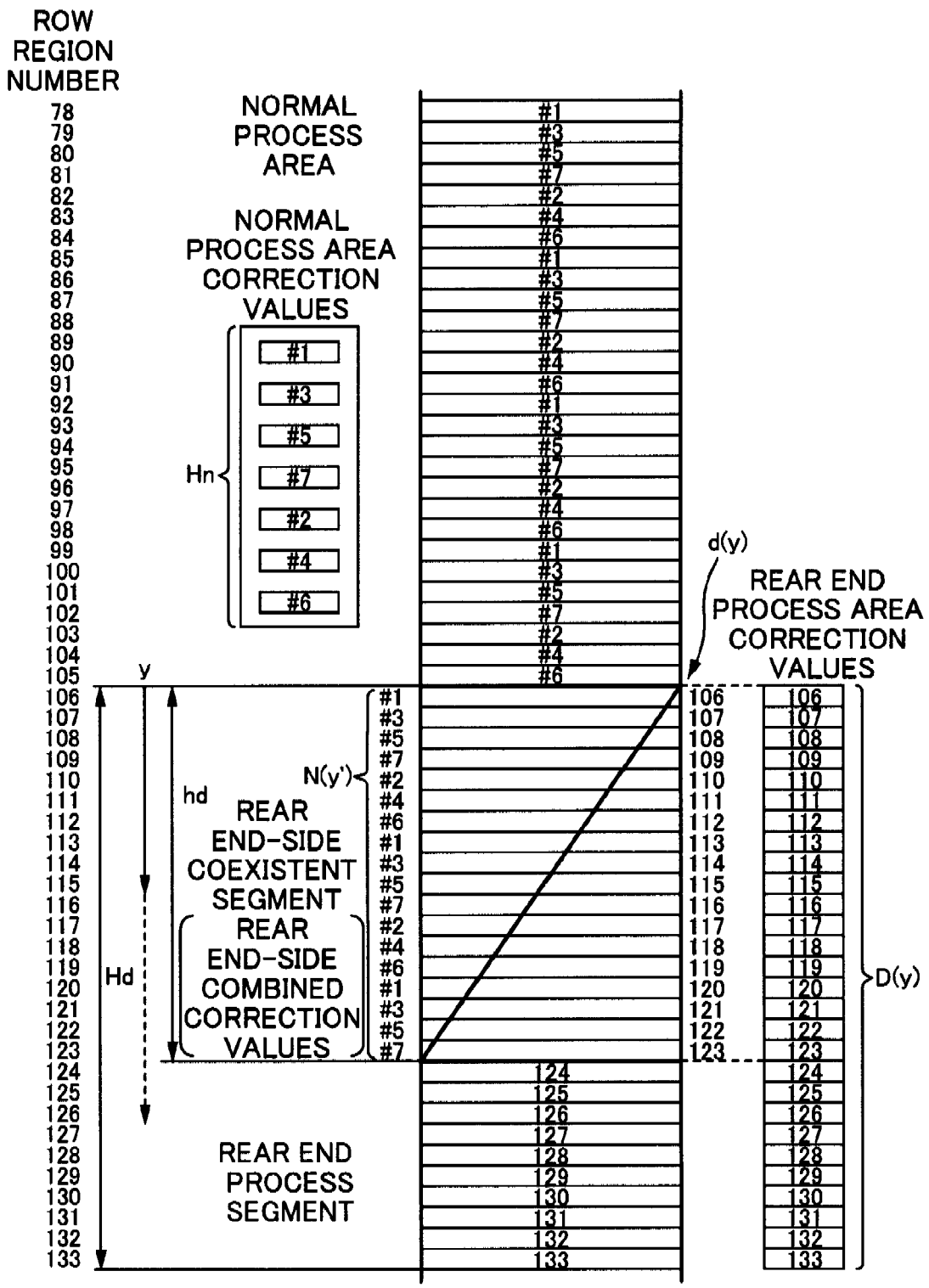
FIG. 22 is a diagram schematically illustrating the relationship between the normal process area correction values, the rear end-side combined correction values, and the rear end process area correction values.

As for the rear end-side combined correction values, the proportion at which the rear end process area correction values and the normal process area correction values are combined is determined based on the position of the row region for which the correction value is to be set in the rear end-side coexistent segment. For example, as shown in FIG. 22, comparing the combined correction values for the row regions positioned close to the normal process area with the combined correction values for the row regions positioned far from the normal process area, the proportion of the normal process area correction values of the former (the closer ones) is set to be greater than the proportion of the normal process area correction values of the latter (the farther ones) Moreover, the proportion of the normal process area correction values is larger the closer the row region is to the normal process area.

The reason for this is that in the rear end-side coexistent segment, the ratio of row regions in which the raster lines are formed by the normal process increases the closer the row regions are to the normal process area. By setting the proportion for the combination in this manner, it is possible to match the proportion for the combination of the normal process area correction value and the rear end process area correction value to the proportion of row regions in which the raster lines are formed by the normal process and the row regions in which the raster lines are formed by the rear end process. That is to say, it is possible to set the proportion of the combination of the two kinds of row regions to match the ratio of the two kinds of row regions. As a result, the rear end-side combined correction values can be optimized and an optimization of the correction can be achieved.

Setting Procedure

Like the front end-side combined correction values, also the rear end-side combined correction values are set by the host-side controller 210 of the process host computer 200'. Therefore, the following parameters are passed to the host-side controller 210 during the setting. As shown in FIG. 22, the number Hd of row regions belonging to the rear end process area, the number Hn of types of normal process area correction values, the number hd of row regions constituting the rear end-side coexistent segment, and the number y of the row region for which the correction value is to be set are passed on as parameters for the calculation. When the number y of the row region is determined, the rear end process area correction value D(y) and the normal process area correction value N (y') corresponding to that number y are specified. Then, when the number y of the row region for which the correction value is to be set is passed to the host-side controller 210, the host-side controller 210 calculates the following Equations (4) to (6) and determines the rear end-side combined correction value d (y) corresponding to that region.

$$\text{If } y > hd: \quad d(y) = D(y) \quad (4)$$

$$\text{If } y \le hd: \quad d(y) = \left[ \frac{hd-y}{hd} \times (N(y') - 128) + \frac{y}{hd} \times (D(y) - 128) \right] + 128 \quad (5)$$

$$y' = ((y-1) \bmod Hn) + 1 \quad (6)$$

As can be seen from Equation (4), when the row region with the number y belongs to the rear end process segment, (that is, when y>hd), then the rear end process area correction value D(y) corresponding to this row region is used as it is. As can be seen from Equation (5), when the row region with the number y belongs to the rear end-side coexistent segment (that is, when y<hd), then ratios between the number hd of the row regions in the rear end process segment and the numbers hd-y and y of row regions occupying the rear end process segment specified by the number y are used. That is to say, the rear end process area correction value D (y) and the normal process area correction value N (y') are combined proportionally at this ratio. It should be noted that for the normal process area correction value, the number y cannot be used as it is. Accordingly, a number y' of the correction value corresponding to the number y is determined as shown in Equation (6). This aspect is as explained for the front end-side combined correction value u(y). Moreover, the specific setting procedure follows the procedure for the front end-side coexistent segment. Therefore, further explanations of the specific procedure are omitted.

Storing of Correction Values

When the correction values have been set, the host-side controller 210 stores the set correction values in the memory 152 (in the correction value storage section 155, see FIG. 14) of the printer-side controller 150 (S255). In this case, the host-side controller 210 is put in a state in which it can communicate with the printer 100 and store the correction values. Then, the host-side controller 210 transfers the correction values stored in the memory 212 and stores them in the memory 152 of the printer-side controller 150. In this correction value setting system 20, the various correction values that have been set based on the measurement values of the stripe-shaped patterns BD(30) to BD(70), that is, the front end process area correction values, the normal process area correction values, the rear end process area correction values, the front end-side combined correction values, and the rear end-side combined correction values are stored.

Printing by the User

With the above-described procedure, the printer 100 in which the correction values have been stored in the correction value storage region 155 is subjected to other inspections and then shipped from the factory. The user who has purchased the printer 100 connects the printer 100 to his or her host computer 200, as shown in FIG. 1 for example. Then, after turning it on, the printer 100 waits for print data to be sent from the host computer 200. When the print data is sent from the host computer 200, a printing operation is performed. This printing operation is as explained above. That is to say, the host computer 200 references the correction values in the color conversion process, and corrects the densities (instructed tone values) of the image in that row region by the corresponding correction value. For example, for row regions that tend to appear too dark, a correction is performed by lowering the tone value of the pixel data (CMYK data) of the unit regions corresponding to that row region. Conversely, for row regions that tend to appear too light, a correction is performed by increasing the tone value of the pixel data of the unit regions corresponding to that row region. Then, the host computer 200 performs halftone processing and the like with the corrected image densities and obtains the print data. The print data generated like this is output to the printer 100. Then, the ink ejection amount is adjusted by the printer 100 based on this print data. Accordingly, the density of image fragments corresponding to the row regions in the images printed with the printer 100 is corrected and density irregularities in the overall image are suppressed.

The following is an explanation of the correction of the ejection amount. As shown in FIG. 21, the host computer 200 and the printer 100 correct the ink ejection amount in the front end process segment based on the front end process area correction values. Thus, the amount of ink ejected in the row regions belonging to the front end process segment is optimized and the image quality can be improved. Then, in the front end-side coexistent segment, the front end-side combined correction values obtained by the combination of the front end process area correction values and the normal process area correction values are used to correct the ink ejection amount for each row region individually. In the front end-side combined correction values, the proportion of the normal process area correction values increases in comparison to the proportion of the front end process area correction values the closer the row region is to the normal process area. Here, in the front end-side coexistent segment, the ratio of the row regions in which the raster lines are formed by the normal process increases when approaching the normal process area. Therefore, it is possible to optimize the correction with the front end-side combined correction values. Furthermore, in the front end-side combined correction values, the proportion of the normal process area correction values and the front end process area correction values changes gradually in accordance with the position of the row region being processed. Therefore, it is possible to prevent sharp changes in the extent of the correction when switching from the front end process area correction values to the normal process area correction values. As a result, it is possible to prevent sharp density changes and to improve the image quality.

Moreover, as shown in FIG. 22, in the rear end-side coexistent segment, the host computer 200 and the printer 100 correct the ink ejection amount for each row region individually, using the rear end-side combined correction values obtained by combining the normal process area correction values and the rear end process area correction values. In the rear end-side combined correction values, the proportion of the normal process area correction values increases in comparison to the proportion of the rear end process area correction values the closer the row region is to the normal process area. Here, in the rear end-side coexistent segment, the ratio of the row regions in which the raster lines are formed by the normal process increases when approaching the normal process area. Therefore, it is possible to optimize the correction with the rear end-side combined correction values. Furthermore, in the rear end-side combined correction values, the proportion of the normal process area correction values and the rear end process area correction values changes gradually in accordance with the position of the row region being processed. Therefore, it is possible to prevent sharp changes in the extent of the correction when switching from the normal process area correction values to the rear end process area correction values. As a result, it is possible to prevent sharp density changes and to improve the image quality.

It should be noted that in the rear end process segment, the aspect that an improvement of the image quality is achieved by correcting the ink ejection amount is the same as for the front end process segment.

Summary

As explained above, with the printing system 10 of the first embodiment, front end-side combined correction values obtained by combining front end process area correction values and normal process area correction values are used for each of the row regions belonging to the front end-side coexistent segment of the front end process area, so that a deterioration of the image at the border between the front end process area and the normal process area of the paper S can be suppressed. Similarly, rear end-side combined correction values obtained by combining rear end process area correction values and normal process area correction values are used for the row regions belonging to the rear end-side coexistent segment of the rear end process area, so that a deterioration of the image at the border between the rear end process area and the normal process area of the paper S can be suppressed.

Moreover, the proportion of the normal process area correction values in the front end-side combined correction values and the proportion of the normal process area correction values in the rear end-side combined correction values are both determined in accordance with the position of the row region for which the correction value is to be set. In this embodiment, in both the front end-side combined correction values and the rear end-side combined correction values, the proportion of the normal process area correction values is increased as the row regions approach the normal process area. Thus, the influence of the correction due to the normal process area correction values is strengthened the closer the row regions are to the normal process area. Therefore, an even more suitable correction is attained.

Other Embodiments

The previous embodiment was mainly explained for a correction value setting system 20 including a printer 100, but it also includes the disclosure of a correction value setting method and a correction value setting device. Moreover, the foregoing embodiment is merely for facilitating the understanding of the present invention, but is not meant to be interpreted in a manner limiting the scope of the present invention. The invention can of course be altered and improved without departing from the gist thereof and includes functional equivalents. In particular, the embodiments mentioned below are also included in the scope of invention.

Other Examples of Combined Correction Values

When calculating the front end-side combined correction values in the above-described embodiment, for each row region whose correction value is to be set, the proportion at which the front end process area correction values and the normal process area correction values are combined is changed in accordance with the position of the row region. Similarly, also when calculating the rear end-side combined correction values, for each row region whose correction value is to be set, the proportion at which the rear end process area correction values and the normal process area correction values are combined is changed in accordance with the position of the row region.

Figure 23A:
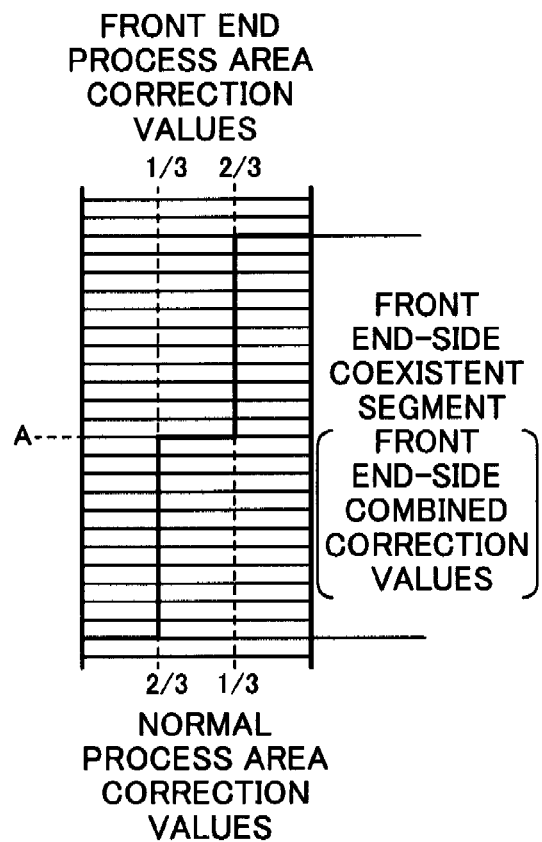
FIG. 23A is a diagram schematically illustrating a second example of front end process area correction values.

However, these combined correction values are not limited to the example of this embodiment. For example, as shown in FIG. 23A, it is also possible to divide the plurality of row regions constituting the front end-side coexistent segment into a plurality of blocks in accordance with their distance from the normal process area, and to change the proportion of the combination with the normal process area correction value for each of those blocks. In this example, the front end-side coexistent segment is divided into two blocks at the border position marked "A", and for the block that is on the side of the front end process area with respect to this border position A, the correction values are combined by setting the proportion of the front end process area correction values to $2/3$ and setting the proportion of the normal process area correction values to $1/3$. Moreover, for the block that is on the side of the normal process area with respect to the border position A, the correction values are combined by setting the proportion of the front end process area correction values to $1/3$ and setting the proportion of the normal process area correction values to $2/3$. With this method, the influence of the correction due to the normal process area correction values (corresponding to the second correction values) is strengthened in the block that is closer to the normal process area, so that a more suitable correction is attained. Moreover, the proportion of the normal process area correction value is determined block by block, so that the control during the setting of the correction values is facilitated. Furthermore, the necessary memory capacity can be reduced.

Figure 23B:
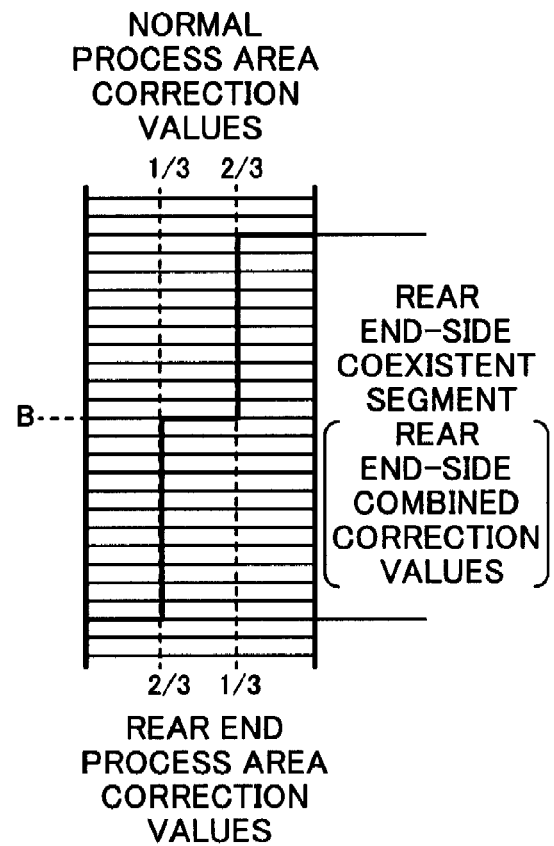
FIG. 23B is a diagram schematically illustrating a second example of rear end process area correction values.

Similarly, as shown in FIG. 23B, it is also possible to divide the plurality of row regions constituting the rear end-side coexistent segment into a plurality of blocks in accordance with their distance from the normal process area, and to change the proportion of the combination with the normal process area correction values for each of those blocks. In this example, the rear end-side coexistent segment is divided into two blocks at the border position marked "B", and for the block that is on the side of the normal process area with respect to this border position B, the correction values are combined by setting the proportion of the normal process area correction values to ⅔ and setting the proportion of the rear end process area correction values to ⅓. Moreover, for the block that is on the side of the rear end process area with respect to the border position B, the correction values are combined by setting the proportion of the normal process area correction values to ⅓ and setting the proportion of the rear end process area correction values to ⅔. With this method, the same effect as with the front end-side combined correction values are attained, such as that a more suitable correction can be achieved.

Figure 24A:
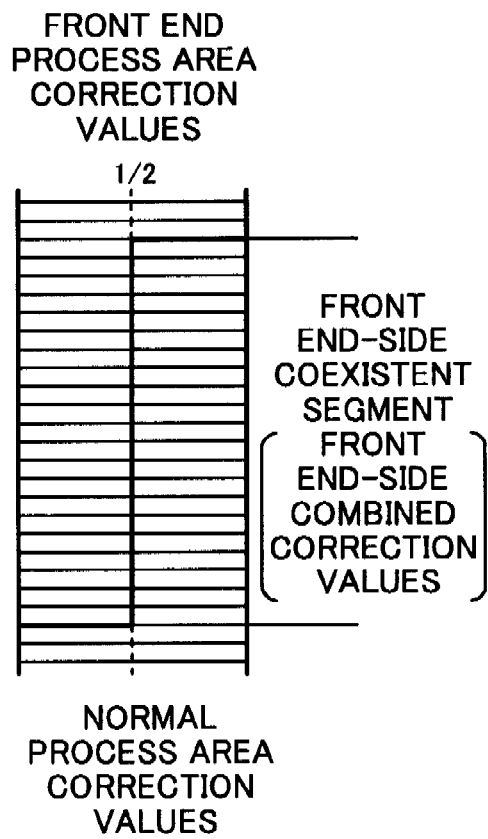
FIG. 24A is a diagram schematically illustrating a third example of front end process area correction values.
Figure 24B:
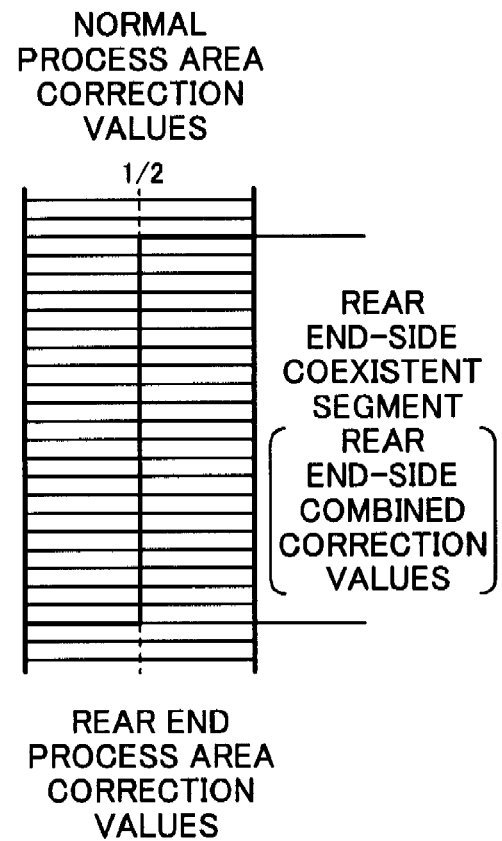
FIG. 24B is a diagram schematically illustrating a third example of rear end process area correction values.

Moreover, it is also possible to set the proportion for the combination of the front end process area correction values and the normal process area correction values regardless of the position of the row regions subjected to the correction. For example, as shown in FIG. 24A, it is also possible to combine the correction values by setting the proportion of the front end process area correction values to ½ and the proportion of the normal process area correction values to ½ for all of the plurality of row regions constituting the front end-side coexistent segment. Similarly, as shown in FIG. 24B, it is also possible to combine the correction values by setting the proportion of the normal process area correction values to ½ and the proportion of the rear end process area correction values to ½ for all of the plurality of row regions constituting the rear end-side coexistent segment. With this method, the proportion at which the front end process area correction values and the normal process area correction values are combined in the front end-side coexistent segment is set uniformly. As a result, the control during the setting of the correction values is facilitated. Furthermore, the necessary memory capacity can be reduced.

Calculation of the Combined Correction Values

In the above-described embodiment, the combined correction values (front end-side combined correction values and rear end-side combined correction values) are calculated by the host-side controller 210 of the process host computer 200' and stored in the correction value storage region 155. With regard to this aspect, it is also possible to calculate the combined correction values during printing with the printing system 10. In this case, the front end process area correction values, the normal process area correction values and the rear end process area correction values are stored in the correction value storage area 155. Then, during the printing on the paper S, the host computer 200 of the printing system 10 (host-side controller 210) calculates the above-noted Equations (1) to (6) and computes the combined correction values. With this configuration, the amount of information stored in the correction value storage region 155 can be reduced. It should be noted that in the case of a printer provided with a printer driver, it is also possible to calculate the combined correction values with the printer. In this case, the front end process area correction values, the normal process area correction values, and the rear end process area correction values should be stored in the correction value storage area 155. Therefore, the capacity of the correction value storage area 155 that is necessary for the storage can be reduced.

The Printing System 10

In the above-described embodiment, the printing system 10 was explained for the case that the printer 100 serving as a printing device and the computer serving as a printing control device are provided separately, but there is no limitation to this configuration. The printing device and the printing control device can also be provided integrally in the printing system 10. Moreover, it can also be a printer/scanner multifunctional apparatus including a scanner 300 as an integral component. With such a multifunctional apparatus, the user can easily set the correction values again. That is to say, it is possible to easily construct a correction value setting system 20.

Setting the Correction Values Again

In the foregoing, it was explained that the correction values are set in the plant. That is to say, it was explained that the correction values are set during the manufacturing. However, with regard to this aspect, it is also possible to set the correction values again after shipping.

Regarding the Ink

In the above-described embodiment, ink of six colors is ejected from the head 131. However, the ink types ejected is not limited to six colors. The types of colors may be different and the number of colors may also be increased. For example, it is also possible to include red ink, violet ink and gray ink.

Other Application Examples

A printer 100 was described in the foregoing embodiment, but there is no limitation to this. For example, technology like that of the present embodiments can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Also these methods and manufacturing methods are within the scope of application.

What is claimed is:

1. A printing method comprising:
   (A) determining a first correction value corresponding to a first print mode that is applied to a front end area, with respect to a transport direction, of a medium,
   the first print mode being for forming dot rows extending in a movement direction on a plurality of row regions lined up in the transport direction, by repeating a movement ejection operation of ejecting ink onto the medium while moving nozzles in the movement direction, which is perpendicular to the transport direction, and a transport operation of transporting the medium in the transport direction,
   the first correction value being for correcting an ejection amount of the ink in each row region individually;
   (B) determining a second correction value corresponding to a second print mode that is applied to a middle area, with respect to the transport direction, of the medium,
   the second print mode being for forming dot rows extending in the movement direction on a plurality of row regions lined up in the transport direction, by repeating the movement ejection operation and the transport operation, the second correction value being for correcting an ejection amount of the ink in each row region individually;

(C) correcting the ejection amount of the ink in each row region individually, using a combined correction value that is obtained by combining the first correction value and the second correction value for a coexistent segment in which certain row regions and another row regions are coexistent, the certain row regions are row regions in which the dot rows are formed by the first print mode and the other row regions are row regions in which the dot rows are formed by the second print mode.

2. A printing method of claim 1, wherein a combination proportion of the first correction value and the second correction value is determined based on a position of the row region to be corrected in the coexistent segment.

3. A printing method of claim 2, wherein the coexistent segment is a segment that is arranged further to a front end side of the medium, with respect to the transport direction, than the middle area, and is a segment where a ratio of the other row regions increases when approaching the middle area, and the proportion of the second correction value in the row regions near the middle area is greater than the proportion of the second correction value in the row regions further away from the middle area.

4. A printing method of claim 3, wherein the proportion of the second correction value increases the closer the row regions are to the middle area.

5. A printing method of claim 3, wherein the coexistent segment is divided into a plurality of blocks of a plurality of row regions in accordance with a distance from the middle area, and the proportion of the second correction value increases the closer the blocks are to the middle area.

6. A printing method of claim 1, wherein the combination proportion of the first correction value and the second correction value is constant, regardless of the position of the row region to be corrected in the coexistent segment.

7. A printing method of claim 1, wherein the first print mode is a print mode in which the dot rows are formed on the plurality of the row regions by repeating the movement ejection operation and a first transport operation of transporting the medium by a first transport amount, and the second print mode is a print mode in which the dot rows are formed on the plurality of the row regions by repeating the movement ejection operation and a second transport operation of transporting the medium by a second transport amount that is larger than the first transport amount.

8. A printing method of claim 1, wherein the nozzles are constituted by nozzle rows that are lined up in the transport direction.

9. A printing method of claim 8, wherein the first correction value is determined for each of the plurality of the row regions belonging to the front end area and the coexistent segment, with respect to the transport direction, of the medium, and a plurality of types of second correction values are determined in accordance with combinations of the row regions and the nozzles responsible for printing on those row regions.

10. A printing method of claim 9, wherein the first correction value is determined based on measured density values of a first area of a test pattern that is printed by the same procedure as the front end area, with respect to the transport direction, of the medium, and the second correction value is determined based on measured density values of a second area of a test pattern that is printed by the same procedure as the middle area, with respect to the transport direction, of the medium, the test pattern being printed for a plurality of periods that is determined by the combinations of the row regions and the nozzles.

11. A printing apparatus comprising:

(A) a nozzle movement mechanism that moves nozzles ejecting ink in a transport direction;

(B) a transport mechanism that transports a medium in a transport direction perpendicular to the movement direction;

(C) a memory that stores a combined correction value obtained by combining a first correction value corresponding to a first print mode and a second correction value corresponding to a second print mode, the first print mode being a print mode that is applied to a rear end area, with respect to the transport direction, of the medium, the first correction value being for correcting an ink ejection amount for individual row regions that are lined up in the transport direction, the second print mode being a print mode that is applied to a middle area, with respect to the transport direction, of the medium, the second correction value being for correcting an ink ejection amount for individual row regions that are lined up in the transport direction; and (D) a controller that controls a movement ejection operation and a transport operation, and corrects the ink ejection amount in each row region individually, the movement ejection operation being an operation of ejecting ink while moving the nozzles, the transport operation being an operation of transporting the medium in the transport direction, a correction of the ink ejection amount being carried out in a coexistent segment where certain row regions and another row regions are coexistent using the combined correction value, the certain row regions being row regions in which dot rows extending in the movement direction are formed by the first print mode and the other row regions being row regions in which dot rows extending in the movement direction are formed by the second print mode.

12. A printing apparatus comprising:

(A) a nozzle movement mechanism that moves nozzles ejecting ink in a transport direction;

(B) a transport mechanism that transports a medium in a transport direction perpendicular to the movement direction;

(C) a memory that stores a first correction value corresponding to a first print mode and a second correction value corresponding to a second print mode, the first print mode being a print mode that is applied to a front end area, with respect to the transport direction, of the medium, the first correction value being for correcting an ink ejection amount for individual row regions that are lined up in the transport direction, the second print mode being a print mode that is applied to a middle area, with respect to the transport direction, of the medium, the second correction value being for correcting an ink ejection amount for individual row regions that are lined up in the transport direction; and
(D) a controller that controls a movement ejection operation and a transport operation, and corrects the ink ejection amount in each row region individually,
the movement ejection operation being an operation of ejecting ink while moving the nozzles, and the transport operation being an operation of transporting the medium in the transport direction,
a correction of the ink ejection amount in a coexistent segment where certain row regions and another row regions are coexistent is carried out using a combined correction value that is obtained by combining the first correction value and the second correction value, the certain row regions being row regions in which dot rows extending in the movement direction are formed by the first print mode and the other row regions being row regions in which dot rows extending in the movement direction are formed by the second print mode.

* * * * *